United States Patent
Zheng et al.

(10) Patent No.: US 10,777,832 B2
(45) Date of Patent: Sep. 15, 2020

(54) SYSTEMS AND METHODS FOR UAV FUEL CELL

(71) Applicant: SZ DJI TECHNOLOGY CO., LTD., Shenzhen (CN)

(72) Inventors: Dayang Zheng, Shenzhen (CN); Lei Wang, Shenzhen (CN); Wentao Wang, Shenzhen (CN); Juncheng Zhan, Shenzhen (CN); Bogao Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 297 days.

(21) Appl. No.: 15/470,572

(22) Filed: Mar. 27, 2017

(65) Prior Publication Data

US 2017/0200961 A1    Jul. 13, 2017

Related U.S. Application Data

(63) Continuation of application No. PCT/CN2015/083393, filed on Jul. 6, 2015.

(51) Int. Cl.
*H01M 8/0656* (2016.01)
*H01M 8/04119* (2016.01)
(Continued)

(52) U.S. Cl.
CPC ......... *H01M 8/0656* (2013.01); *B64C 39/024* (2013.01); *H01M 8/04156* (2013.01); *H01M 8/04201* (2013.01); *H01M 8/04208* (2013.01); *H01M 8/04216* (2013.01); *H01M 8/04753* (2013.01); *H01M 8/04761* (2013.01); *H01M 8/04776* (2013.01); *H01M 8/0662* (2013.01); *B64C 2201/027* (2013.01);
(Continued)

(58) Field of Classification Search
CPC .................................................. H01M 8/0656
See application file for complete search history.

(56) References Cited

U.S. PATENT DOCUMENTS 5,527,066 A    6/1996  Svensson
6,610,433 B1 *  8/2003  Herdeg ............. H01M 8/04208
                                                429/443
(Continued)

FOREIGN PATENT DOCUMENTS

CN    1429165 A    7/2003
CN    1534817 A    10/2004
(Continued)

OTHER PUBLICATIONS

CityofPhoenix (Year: 2019).*
(Continued)

*Primary Examiner* — Brian R Ohara
(74) *Attorney, Agent, or Firm* — Anova Law Group, PLLC

(57) ABSTRACT

Systems, methods, and devices are provided herein for removing a byproduct of a fuel cell from a vehicle. The vehicle comprises a fuel cell and a venting system. The fuel cell is in communication with a fuel storage container. The fuel is configured to generate electricity and a byproduct, by reacting a first fuel from the fuel storage container with a second fuel through an electrochemical reaction. The venting system is configured to expose the byproduct to forced convection.

16 Claims, 13 Drawing Sheets

(51) Int. Cl.
*H01M 8/04082* (2016.01)
*H01M 8/04746* (2016.01)
*H01M 8/0662* (2016.01)
*B64C 39/02* (2006.01)

(52) U.S. Cl.
CPC .. *B64C 2201/042* (2013.01); *B64C 2201/108* (2013.01); *H01M 2250/20* (2013.01); *H01M 2250/402* (2013.01); *Y02B 90/10* (2013.01); *Y02T 90/40* (2013.01)

(56) References Cited

U.S. PATENT DOCUMENTS

| | | | |
|---|---|---|---|
| 7,278,607 | B2 | 10/2007 | Fuller |
| 7,886,940 | B2 | 2/2011 | Lavan |
| 8,201,773 | B1 * | 6/2012 | Durham ............... B64C 39/028 244/218 |
| 8,286,414 | B2 | 10/2012 | Gallagher et al. |
| 8,939,396 | B2 | 1/2015 | Geneste et al. |
| 8,967,533 | B2 | 3/2015 | Devaul et al. |
| 2002/0017463 | A1 * | 2/2002 | Merida-Donis ....... C02F 1/4691 204/551 |
| 2004/0148857 | A1 * | 8/2004 | Strizki ................. C01B 3/065 48/127.9 |
| 2004/0173615 | A1 * | 9/2004 | Goodman ............... H01M 8/04 220/495.06 |
| 2004/0245385 | A1 | 12/2004 | McElroy et al. |
| 2006/0026900 | A1 | 2/2006 | Jang |
| 2006/0059778 | A1 * | 3/2006 | Shurtleff ........... H01M 8/04208 48/61 |
| 2008/0052994 | A1 * | 3/2008 | Nojima ............. H01M 8/04208 48/178 |
| 2013/0037654 | A1 | 2/2013 | Zhang et al. |
| 2018/0273194 | A1 * | 9/2018 | Edgar .................. B64C 39/024 |

FOREIGN PATENT DOCUMENTS

| | | |
|---|---|---|
| CN | 101068716 A | 11/2007 |
| CN | 101405530 A | 4/2009 |
| CN | 101447576 A | 6/2009 |
| CN | 101826645 A | 9/2010 |
| CN | 201672864 U | 12/2010 |
| CN | 102020019 A | 4/2011 |
| CN | 102963525 A | 3/2013 |
| CN | 203154819 U | 8/2013 |
| CN | 103847970 A | 6/2014 |
| CN | 104053597 A | 9/2014 |
| CN | 104282926 A | 1/2015 |
| CN | 104364154 A | 2/2015 |
| EP | 2228301 A2 | 9/2010 |
| JP | S52148624 U | 11/1977 |
| JP | 2004281107 A | 10/2004 |
| JP | 2004359494 A | 12/2004 |
| JP | 2005053353 A | 3/2005 |
| JP | 2006140165 A | 6/2006 |
| JP | 2008507093 A | 3/2008 |
| JP | 2009037870 A | 2/2009 |
| JP | 2009117297 A | 5/2009 |
| JP | 2009161203 A | 7/2009 |
| JP | 2009179321 A | 8/2009 |
| JP | 2009257355 A | 11/2009 |
| JP | 2009261240 A | 11/2009 |
| JP | 2010132280 A | 6/2010 |
| JP | 2010208623 A | 9/2010 |
| JP | 2014103087 A | 6/2014 |
| WO | WO-2011009105 A1 | 1/2011 |

OTHER PUBLICATIONS

Nitrogen properties (Year: 2020).*
EnergyOR Technologies Inc. Energyor demonstrates multirotor UAV flight of 3 hours, 43 minutes (/news/post:30). Available at http://energyor.com/news/post:30. Accessed Jul. 6, 2017.
EnergyOR Technologies Inc. High Density Stacks. Available at http://energyor.com/technology/high-density-stacks. Accessed Jul. 6, 2017.
International search report and written opinion dated Feb. 24, 2016 for PCT Application No. PCT/CN2015/083393.
MarEx. World's First Fuel Cell Drone Unveiled. The Maritim Executive. May 13, 2015.
Wikipedia. Proton exchange membrane fuel cell. Available at https://en.wikipedia.org/wiki/Proton_exchange_membrane_fuel_cell. Accessed Jul. 10, 2017.

* cited by examiner

SYSTEMS AND METHODS FOR UAV FUEL CELL

CROSS-REFRENCE

This application is a continuation application of International Application No. PCT/CN2015/083393, filed Jul. 6, 2015, which is incorporated herein by reference in its entirety.

BACKGROUND

Aerial vehicles such as unmanned aerial vehicles (UAVs) can be used for performing surveillance, reconnaissance, and exploration tasks for military and civilian applications. Such aerial vehicles may carry a payload configured to perform a specific function.

Conventional aerial vehicles may include a multi-rotor structure which may employ a lithium-ion battery as an energy source. However, a flight time of the vehicle may be limited, given that the lithium-ion battery has limited energy density and the multi-rotor structure has high power consumption. This limited range reduces the usefulness of aerial vehicles in particular applications.

SUMMARY

A need exists to reduce the load of the aerial vehicle to increase flight time of the vehicle. The increased flight time provides an increased range of travel for the vehicle. Increased range may be particularly useful when the aerial vehicle is used to deliver items, spray an environment, or patrol or scan an area.

In some instances, the lithium-ion battery in a conventional vehicle may be replaced by a fuel cell to increase the flight time of the vehicle. A fuel cell has several advantages over a lithium-ion battery. For instance, a fuel cell has a high energy density, e.g., about 800-1000 Wh/Kg, which is about 5-10 times greater than the energy density of a lithium-ion battery. The fuel cell can also be recharged by adding fuel, and can be used without having to be electrically recharged. Unlike a lithium-ion battery, the fuel cell does not undergo charge-discharge capacity losses and thus has a long service life.

However, some challenges arise in various fuel cell designs. For instance, the fuel (e.g. hydrogen) for the fuel cell may be stored in a highly pressurized gas tank. Traditional compressed hydrogen gas tanks are much larger and heavier than what is desired for light-duty vehicles. Also, a byproduct is generated by the electrochemical reaction in the fuel cell. The weight of the gas tank and byproduct may increase the load of the vehicle, which increases power consumption and reduces flight time of the vehicle. In addition, heat generated by the electrochemical reaction in the fuel cell may affect performance/reliability of the fuel cell, as well as other internal components of the vehicle.

A further need exists to remove the heat generated by the fuel cell to improve fuel cell performance/reliability and to prevent the heat from affecting other internal components of the vehicle. Systems, methods, and devices are provided herein to address at least the above needs.

For instance, in some embodiments, the load of the vehicle may be reduced by using lightweight storage containers to store the fuel, instead of using highly pressurized heavy gas tanks. In addition, the load of the vehicle load may be further reduced by removing the byproduct of the fuel cell electrochemical reaction from the vehicle. Furthermore, the heat generated by the fuel cell may be removed by using the byproduct to cool the fuel cell.

According to an aspect of the invention, a vehicle comprises a fuel cell and a venting system. The fuel cell is in communication with a fuel storage container. The fuel is configured to generate electricity and a byproduct, by reacting a first fuel from the fuel storage container with a second fuel through an electrochemical reaction. The venting system is configured to expose the byproduct to forced convection.

Further aspects of the invention may be directed to a method for removing a byproduct from a vehicle, the method comprising: generating electricity and the byproduct, using a fuel cell in communication with a fuel storage container, by reacting a first fuel from the fuel storage container with a second fuel through an electrochemical reaction; and exposing the byproduct to forced convection.

A vehicle may be provided in accordance with an additional aspect of the invention. The vehicle may comprise a fuel cell, a housing configured to contain the fuel cell, and venting system. The fuel cell is in communication with a fuel storage container. The fuel cell is configured to generate electricity and a byproduct, by reacting the first fuel with a second fuel through an electrochemical reaction. The venting system is configured to expose the byproduct to an ambient environment via one or more opening in the housing.

Further aspects of the invention may be directed to a method for removing a byproduct from a vehicle, the method comprising: generating electricity and the byproduct, using a fuel cell (1) contained within a housing and (2) in communication with a fuel storage container, by reacting a first fuel from the fuel storage container with a second fuel through an electrochemical reaction; and exposing the byproduct to an ambient environment via one or more opening in the housing.

A vehicle may be provided in accordance with another aspect of the invention. The vehicle may comprise a fuel cell and a cooling system. The fuel cell is in communication with a fuel storage container. The fuel cell is configured to generate electricity and a liquid byproduct, by reacting a first fuel from the fuel storage container with a second fuel through an electrochemical reaction. The cooling system is configured to effect evaporation of the byproduct, wherein the evaporation of the byproduct is used to cool the fuel cell.

Further aspects of the invention may be directed to a method for removing a byproduct from a vehicle, the method comprising: generating electricity and the byproduct, using a fuel cell in communication with a fuel storage container, by reacting a first fuel from the fuel storage container with a second fuel through an electrochemical reaction; evaporating the byproduct; and cooling the fuel cell using the evaporation of the byproduct.

An energy delivery system may be provided in accordance with a further aspect of the invention. The energy delivery system may comprise at least one solar cell, an electrolysis module, a fuel cell, and a controller. The solar cell is configured to receive solar energy and generate electrical energy. The electrolysis module is configured to generate hydrogen from water. The fuel cell is configured to generate electricity by reacting the hydrogen with another fuel through an electrochemical reaction, wherein the electricity is used to power a device. The controller is configured to generate instructions for the solar cell to provide the electrical energy to at least one of the group consisting of: (1) the electrolysis module to effect operation of the electrolysis module, and (2) the device.

Further aspects of the invention may be directed to a method for delivering energy, the method comprising: generating electrical energy at a solar cell using solar energy received at the solar cell; and selecting, with aid of a controller, whether the solar cell is to provide the electrical energy to (1) an electrolysis module configured to generate hydrogen from water, wherein the hydrogen is used by a fuel cell to generate electricity in combination with another fuel through an electrochemical reaction, to power a device, or (2) the device.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Systems, methods, and devices provided herein permit the load of an aerial vehicle having a fuel cell system to be reduced, thereby improving the flight time and range of the vehicle. The load of the vehicle may be reduced by using lightweight storage containers to store the fuel for the fuel cell, instead of using highly pressurized heavy gas tanks. The lightweight storage containers may comprise lightweight fuel bags for storing fuel. In some embodiments, the lightweight storage containers may be filled with a fuel that has a substantially lower density than air, which generates a lift force that helps to offset the load of the vehicle. In addition, the load may be further reduced by removing the electrochemical reaction byproduct of the fuel cell from the vehicle. In one embodiment, the byproduct may be removed through an electrolysis process, which also generates additional fuel for the fuel cell. In another embodiment, the byproduct may be removed by applying forced convection to evaporate the byproduct. The evaporated byproduct is then discharged from the vehicle through one or more exhaust vents on the body of the vehicle. Lastly, heat generated by the fuel cell may be removed by applying forced convection to the byproduct to assist in cooling the fuel cell, which may help to improve its performance and reliability.

It shall be understood that different aspects of the invention can be appreciated individually, collectively, or in combination with each other. Various aspects of the invention described herein may be applied to any of the particular applications set forth below or for any other types of remotely controlled vehicles or movable objects.

The present invention provides embodiments of systems, devices, and/or methods for reducing the load of an unmanned aerial vehicle (UAV) having a fuel cell system, to improve the flight time and range of the vehicle. Description of the UAV may be applied to any other type of aerial vehicle, or any other type of movable object. Description of the vehicle may apply to land-bound, underground, underwater, water surface, aerial, or space-based vehicles. The UAV may be powered by a fuel cell. The UAV may have a fuel cell system which may include the fuel cell. The fuel cell may generate electricity through an electrochemical reaction between fuels. The electricity generated by the fuel cell may be used to power the UAV. In some embodiments, excess electricity generated by the fuel cell may be stored in an energy storage unit (e.g., batteries) for future use. The fuel cell system may optionally also have an electrolysis module in addition to the fuel cell. Electrolysis of the byproduct of the fuel cell electrochemical reaction allows the byproduct to be removed, through decomposition of the byproduct into its elements). Electrolysis of the byproduct can also generate additional fuel for the fuel cell. The electrolysis module may be powered by a renewable energy source, e.g., a solar cell.

Figure 1:
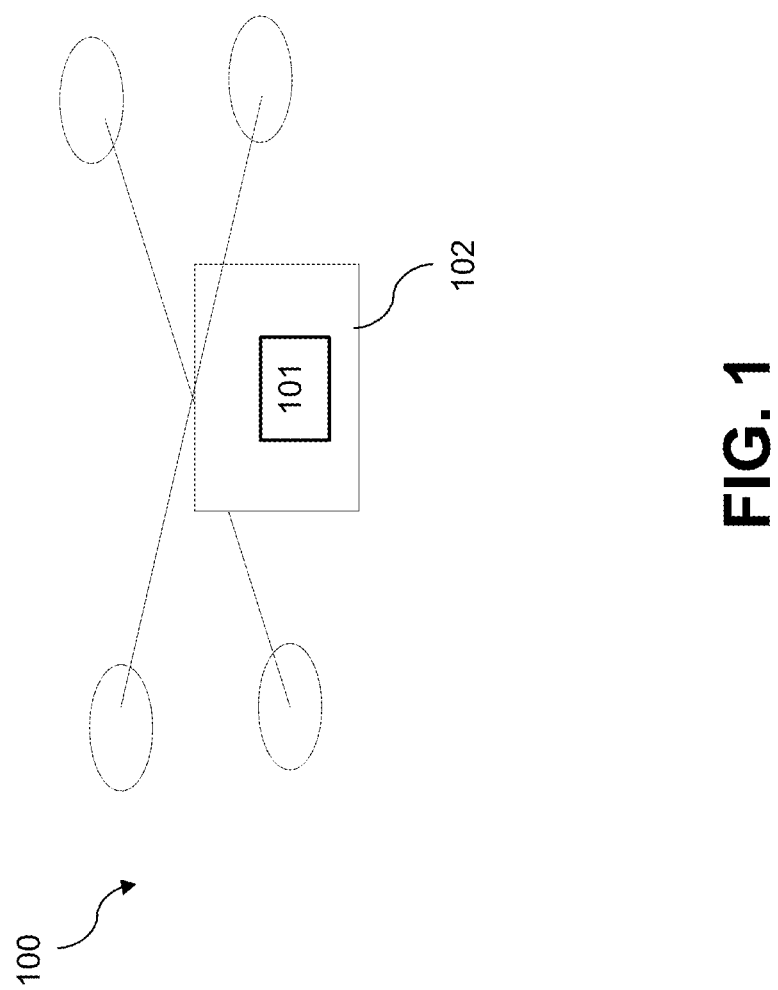
FIG. 1 illustrates an unmanned aerial vehicle (UAV) having a fuel cell system, in accordance with some embodiments.

FIG. 1 shows an example of an unmanned aerial vehicle (UAV) 100 that may be powered by a fuel cell. A fuel cell system 101 comprising the fuel cell may be provided in accordance with embodiments of the invention. The fuel cell system may be disposed in a housing 102 of the UAV. The fuel cell may be configured to provide power to the UAV.

Any description herein of the UAV may apply to any type of movable object. The description of a UAV may apply to any type of unmanned movable object (e.g., which may traverse the air, land, water, or space). The UAV may be capable of responding to commands from a remote controller. The remote controller need not be physically connected to the UAV, and may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

Any description of a UAV may apply to any type of aerial vehicle, and vice versa. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

Rotation of the rotor blades may cause a flow of air. The flow of air may be used to generate lift for the UAV. The flow of air may optionally be introduced into an interior of the UAV. The flow of air may cause forced convection within the UAV, as described in greater detail below.

The fuel cell system may be used to provide power to the UAV. The fuel cell system may power one or more components of the UAV, or the entirety of the UAV. The fuel cells system may provide power to the propulsion units of the UAV. The fuel cell system may provide power to a flight control system, a navigation system, one or more sensors, a carrier, a payload, a communication system, or any other component of the UAV. The fuel cell system may include a fuel cell. The fuel system may optionally include an energy storage unit (e.g., battery), electrolysis module, solar generation system, or any other energy storage or generation unit.

The UAV may have a housing. The housing may include one or more internal cavities. The fuel cell system may be within the housing of the UAV. The fuel cell system may be within one or more internal cavities of the housing. The UAV may include a central body. The cavity and/or fuel cell system may be within the central body of the UAV. The UAV may optionally have one or more arms branching from the central body. The arms may support the propulsion units. One or more branch cavities may be within the arms of the UAV. The branch cavities may be in fluidic communication with a central cavity within the central body. The fuel cell system may be within the central cavity, within a branch cavity, or distributed between the central cavity and/or one or more branch cavities. The housing may or may not include the arms that branch from the central body. In some instances, the housing may be formed from an integral piece that encompasses the central body and the arms. Alternatively, separate housings or pieces are used to form the central body and arms.

The housing may at least partially isolate the fuel cell system from the external environment. In some instances, the housing may hide the fuel cell system from view. The housing may or may not barometrically isolate the fuel cell system from the external environment. In some instances, one or more vents may be provided that may permit air flow between the external environment and the fuel cell system. The housing may or may not shield the fuel cell system from water or precipitation.

Figure 2:
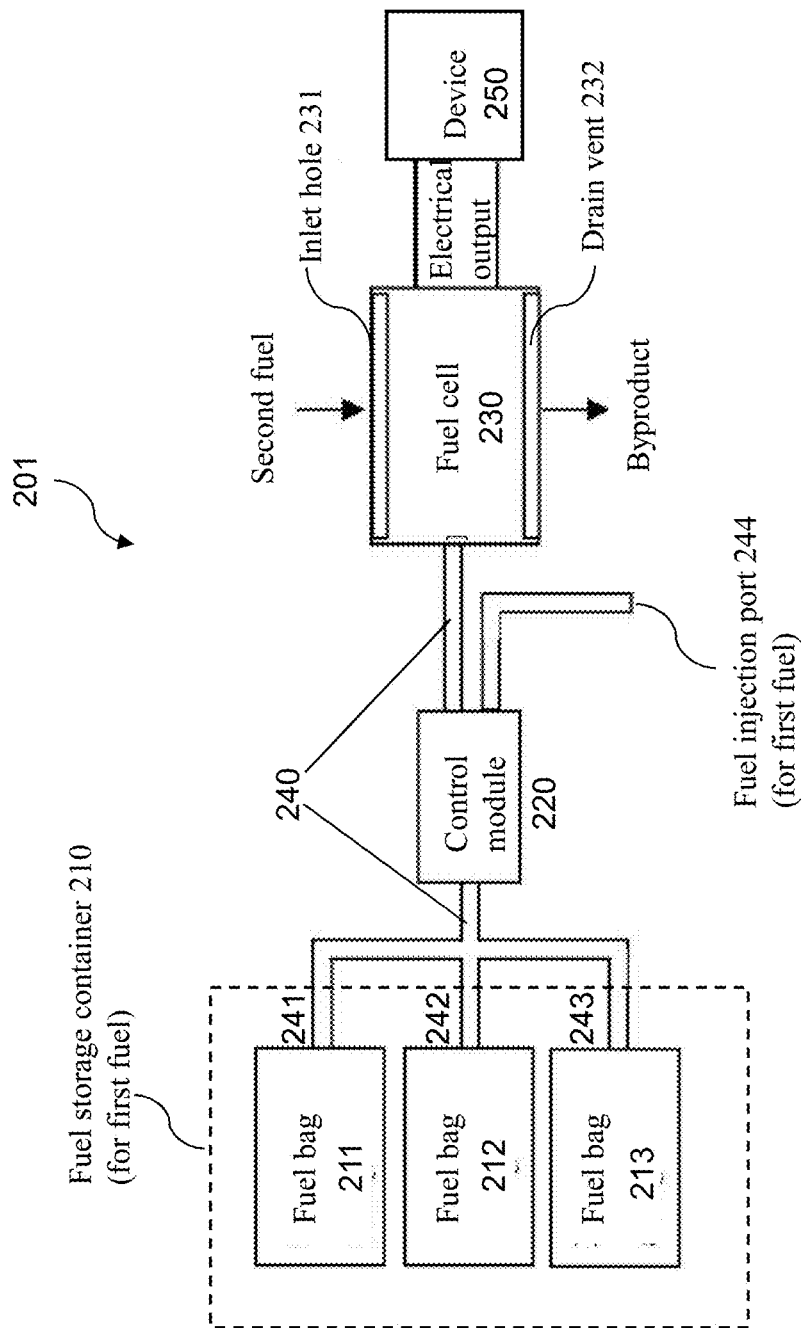
FIG. 2 illustrates a fuel cell system in accordance with an embodiment.

FIG. 2 illustrates a fuel cell system in accordance with an embodiment. Referring to FIG. 2, a fuel cell system 201 may comprise a fuel storage container 210, a control module 220, and a fuel cell 230. The fuel cell system may be provided on a UAV, and may be used to power the UAV. The fuel storage container may be connected to the fuel cell via a single pipe or a plurality of pipes.

The fuel storage container may be configured to store a first fuel. The first fuel serves as a fuel source for the fuel cell. The first fuel may be hydrogen provided in a gaseous state or a liquid state. Any hydrogen-rich material, for example organic matter such as biomass and hydrocarbons, may also serve as the first fuel for the fuel cell. For instance, the first fuel may comprise hydrocarbon fuels including methanol, ethanol, natural gas, petroleum distillates, liquid propane gasified coal, or chemical hydrides. In some other embodiments, hydrogen in the first fuel may be derived from non-carbon containing compounds, such as ammonia ($NH_3$) or borohydrides ($BH_4^-$).

In some embodiments, the fuel storage container may comprise a fuel storage material for storing the first fuel. The fuel storage material may be capable of absorbing and releasing the first fuel and may possess favorable hydrogen storage attributes. For instance, the first fuel may be stored in the bulk of the fuel storage material via absorption, and/or stored on a surface of the fuel storage material via adsorption. In some other embodiments, the first fuel may be stored in the fuel storage material by chemically reacting it with the fuel storage material. In those alternative embodiments, the fuel storage material may comprise a complex hydride such as sodium alanate-based complex metal hydrides.

The fuel storage container may comprise one or more fuel bags for storing the first fuel. Any number of fuel bags may be provided in the fuel storage container. For instance, as shown in FIG. 2, the fuel storage container may comprise a plurality of fuel bags 211, 212, and 213 for storing the first fuel. One or more, two or more, three or more, four or more, five or more, six or more, eight or more, ten or more, fifteen or more, or twenty or more fuel bags may be provided. The fuel bag may be a conformable bag having a chamber for storing the first fuel. The fuel bag may be formed from a flexible material such as a fabric, bladder, elastomeric material, or any other material. One or more portion of the fuel bag may freely bend or fold. The fuel bag may or may not be formed from an expandable or stretchable material. The fuel bag may be formed of a light-weight polymer. The light-weight polymer may include polyester, polyester fiber, mylar, or reinforced nylon. The fuel bag may be formed from one or more organic materials. In some instances, the entirety of the fuel bag may be formed from an organic material. When the fuel bag is not filled with the first fuel, the fuel bag may have a deflated configuration. The deflated configuration may be folded, rolled, or bunched in on itself. When the fuel bag is filled with the first fuel, the fuel bag may be fully inflated and stretched under tension.

The fuel bag may take any shape. In some instances, the fuel bag may be substantially spherical, ellipsoidal, cylindrical, prismatic, torus-shaped, tear-drop shaped, be a flattened sphere or ellipse or other polygon, bowl-shaped, or have any other shape when inflated. In some instances, multiple fuel bags may be provided on an aerial vehicle. The fuel bags may all have the same shape and/or size, or may have different shapes and/or size.

In some embodiments, the fuel bag may be made of a composite material having a tenacity of about 160 gram-force/Denier (g/D). The tenacity is a special parameter for characterizing the breakdown strength of fiber in the composite material. In some embodiments, the tenacity of the fuel bag material may be less than 160 g/D. For example, the tenacity may be less than or equal to about: 160 g/D, 150 g/D, 140 g/D, 130 g/D, 120 g/D, 110 g/D, 100 g/D, 90 g/D, 80 g/D, 70 g/D, 60 g/D, 50 g/D, 40 g/D, 30 g/D, 20 g/D, or 10 g/D. In some other embodiments, the tenacity of the fuel bag material may be greater than 160 g/D. For example, the tenacity may be greater than or equal to about: 160 g/D, 170 g/D, 180 g/D, 190 g/D, 200 g/D, 210 g/D, 220 g/D, 230 g/D, 240 g/D, 250 g/D, or 260 g/D.

The material of the fuel bag may withstand a strain of about 150%. In some embodiments, the strain may be less than 150%. For example, the strain may be less than or equal to about: 150%, 140%, 130%, 120%, 110%, or 100%. In some other embodiments, the strain may be greater than 150%. For example, the strain may be greater than or equal to about: 150%, 160%, 170%, 180%, or 200%.

The fuel bag may be flame-resistant since the first fuel may be highly combustible (e.g., hydrogen). In some embodiments, the fuel bag may be formed of multiple layers. The fuel bag may be formed from one or more, two or more, three or more, four or more, five or more, or six or more layers. The multiple layers may comprise an inner layer and a shell layer. The inner layer may be disposed on an inner wall of the chamber, and the shell layer may be disposed on an outer wall of the chamber, such that the shell layer is placed over the inner liner. The inner liner may be formed of a high-molecular-weight polymer and serves as a barrier to prevent the first fuel from permeating out of the fuel bag. The shell layer serves as a pressure load-bearing component of the fuel bag and provides light-weight structural reinforcement. In some embodiments, the shell layer may be made of an elastic carbon fiber-epoxy resin composite. A thickness of the shell layer may be equal to or greater than a predetermined thickness to prevent the shell layer from rupturing under high pressures. The thickness of the shell layer may be designed such that the fuel bag remains elastic and conformable under high pressures.

In some alternative embodiments, the fuel storage container may be formed from a rigid material. For instance, the fuel storage container may be a structurally rigid tank having a chamber for storing the first fuel.

The fuel bag may be configured to prevent or reduce leakage of hydrogen, even when the hydrogen is stored at high pressure within the bag. For instance, less than 15%, 10%, 7%, 5%, 3%, or 1% of the hydrogen may leak from the bag over a 1, 5, 10, 15, 20, 30, 45, 60, or 120 minute period of time. This may be the case, even when the hydrogen is stored at a pressure exceeding 10 psi, 11 psi, 12 psi, 13 psi, 14 psi, 15 psi, 16 psi, 17 psi, 18 psi, 20 psi, 25 psi, 30 psi, 35 psi, 40 psi, 45 psi, 50 psi, 60 psi, 70 psi, 80 psi, 90 psi, or 100 psi.

The fuel bags may have a volume that may permit sufficient storage of hydrogen without impeding flight of the UAV. In some instances, the volume of fuel bags may be less than or equal to about 10 $cm^3$, 20 $cm^3$, 30 $cm^3$, 50 $cm^3$, 70 $cm^3$, 100 $cm^3$, 200 $cm^3$, 300 $cm^3$, 500 $cm^3$, 1000 $cm^3$, 1500 $cm^3$, 2000 $cm^3$, 3000 $cm^3$, 5000 $cm^3$, 10000 $cm^3$, 20000 $cm^3$, or 50000 $cm^3$. In some instances, the volume of the fuel bags may be greater than any of the values described. The volume of the fuel bags may fall within a range between any two of the values described herein. In some instances, the ratio of a volume of an individual fuel bag to a volume within a housing of the UAV (e.g., including the central body and arms) may be less than or equal to about 1:20, 1:15, 1:10, 1:8, 1:7, 1:6, 1:5, 1:4, 1:3, 1:2, 1:1, 1.2:1, 1.5:1, or 2:1. The ratio of the volume may be greater than any of the values described herein. In some instances, the ratio of the volume of the sum of all of the fuel bags to a volume within a housing of the UAV may be less than or equal to about 1:15, 1:10, 1:8, 1:7, 1:6, 1:5, 1:4, 1:3, 1:2, 1:1, 1.2:1, 1.5:1, 2:1, or 3:1. The ratio of the volume may be greater than of the values described herein.

In some embodiments, the fuel storage container may further comprise a storage case. Optionally, a storage case may be provided for each fuel bag. Alternatively, multiple fuel bags may correspond to a single storage case. The fuel bag is configured to be disposed inside the storage case. The storage case may be located on a vehicle, and may be integrally connected to the housing or body of the vehicle. The storage case serves to protect the bag from external impact and damage. The storage case may be made of a light-weight material. The storage case may be formed from a rigid material. The fuel bag may conform to an interior space of the storage case when the first fuel is being stored in the fuel bag. An interior space of the storage case may have a symmetric shape. In some alternative embodiments, the interior space of the storage case may have an irregular shape. A maximum volume of the fuel bag may be determined based on a maximum volume of the interior space of the storage case. An outer surface of the bag may be in contact with inner walls of the storage case when the bag is at its maximum volume. A volume of the fuel bag increases when the fuel bag is filled with the first fuel. In some embodiments, the storage case may be partially filled with an inert gas (e.g., helium) to reduce the risk of explosion if the first fuel is highly flammable (e.g., hydrogen).

One or more pipes may define a flow path for the first fuel from the fuel storage container to the fuel cell. The pipes may comprise a main fuel pipe 240, and a plurality of distribution pipes 241, 242, and 243. Each distribution pipe may be connected to a corresponding fuel bag. For instance, a first distribution pipe 241 is connected to a first fuel bag 211 so that the first fuel from the first fuel bag may flow along the first distribution pipe. Similarly, a second distribution pipe 242 may be connected to a second fuel bag 212 so that the first fuel from the second fuel bag may flow along the second distribution pipe. Likewise, a third distribution pipe 243 may be connected to a third fuel bag 213 so that the first fuel from the third fuel bag may flow along the third distribution pipe. The distribution pipes are connected to the main fuel pipe which is directly connected to the fuel cell. In some alternate embodiments, the fuel bags may each individually connect to a main fuel pipe without requiring separate distribution pipes. Each of the fuel bags may be put into selective fluid communication with the fuel cell. This communication may be facilitated using one or more shared pipe, separate pipes, or any combination thereof. The plurality of pipes may be provided in the form of gas pipes, air ducts, hoses, tubes, etc. The pipes may be formed from a flexible or rigid material. The pipes may be made of an appropriate plastic or metal material that is chemically resistant to the fuel. The pipes may enable laminar flow of fuel through the pipes.

The fuel bags may remain in fluid communicate with the distribution pipes and/or any other pipe. Alternatively they may in selective fluid communication with the pipes. The fuel bags may be brought in and out of fluid communication with the pipes. For instance, a valve may control a flow of fuel between the bag and the distribution pipe. In some embodiments, each fuel bag may have a corresponding valve that may allow control of whether each individual fuel bag is in fluid communication with a pipe. The valves may be independently controlled, which may allow fuel bags to independently be brought into or out of fluid communication with one or more pipes.

In some embodiments, a fuel injection port 244 may be provided along the main fuel pipe. For instance, the fuel injection port may be provided between the fuel storage container and the fuel cell. The fuel injection port may be configured to accept the first fuel to fill the fuel storage container. For instance, the fuel injection port may accept the first fuel from a fuel source pump to fill one or more fuel bags. In some embodiments, the fuel injection port may be connected to a fuel injection pipe that extends to an outer surface of the housing or body of the UAV. An external fuel source may provide the first fuel via the fuel injection port. The external fuel source may be separate or separable from the UAV. The external fuel source may be affixed to the fuel injection port to deliver the first fuel.

The first fuel may be initially supplied to the fuel storage container via the fuel injection port/pipe until a pressure of the first fuel in the fuel storage container reaches a predetermined pressure threshold. The control module 220 may be configured to monitor the pressure of the first fuel and to shut off the supply of the first fuel to the fuel storage container when the pressure of the first fuel reaches the predetermined pressure threshold. In some embodiments, the predetermined pressure is defined such that an outer surface of the fuel bag is in contact with inner walls of the storage case when the fuel bag is filled with the first fuel. In some other embodiments, the predetermined pressure is defined such that an outer surface of the fuel bag is about to contact the inner walls of the storage case when the fuel bag is filled with the first fuel. In some further embodiments, predetermined pressure is defined such that an outer surface of the fuel bag contacts the inner walls of the storage case for an amount of time while the fuel bag is being filled with the first fuel. The pressure of the first fuel may be monitored using one or more gas pressure sensors located in the fuel bags or along the pipes. For instance, a gas pressure sensor may be located along the pipes after each control valve. The gas pressure sensors provide feedback to a controller in the control module. Contact between the outer surface of the fuel bag and the inner walls of the storage case may be monitored using contact and/or proximity sensors located on the inner walls of the storage case. The fuel storage container may be configured to store the first fuel and permit the first fuel to reach the predetermined pressure with less than a 0.01% leakage per minute. The predetermined pressure may be about 800 MPa. In some embodiments, the predetermined pressure may be less than 800 MPa. For example, the predetermined pressure may be less than or equal to about: 800 MPa, 700 MPa, 600 MPa, 500 MPa, 400 MPa, 300 MPa, 200 MPa, 100 MPa, 50 MPa, 10 MPa, or 1 MPa. In some other embodiments, the predetermined pressure may be greater than 800 MPa. For example, the predetermined pressure may be greater than or equal to about: 800 MPa, 900 MPa, 1000 MPa, 1100 MPa, 1200 MPa, 1300 MPa, 1400 MPa, or 1500 MPa.

Optionally, the predetermined pressure may be individualized to each bag. For instance, as a pressure within each bag reaches a particular predetermined pressure value, the flow may automatically shut off to that bag. Different bags may reach a predetermined pressure at the same time or at different times. The predetermined pressure for each bag may be the same, or may be different.

In some embodiments, the fuel storage container may generate a lift force when the first fuel is stored in the fuel storage container. As mentioned, the first fuel may be hydrogen, or another fuel that may be lighter than air. In those embodiments, the density of the first fuel in the fuel storage container may be substantially lower than a density of air outside the fuel storage container. The lift force can provide lift (aerostatic lift) to the UAV. The additional lift force may lower a payload, reduce power consumption, and increase flight time of the UAV. The pressure of the first fuel in the fuel storage container may be provided below a neutral buoyancy pressure such that the fuel storage container may attain a lighter-than-air state to generate the lift force. The pressure of the first fuel in the fuel storage container may change as the first fuel is being consumed by the fuel cell. To counter the change in pressure, a pump may be provided along one or more pipes to control and regulate the pressure of the first fuel in the fuel storage container. The pump may be configured to pump the first fuel from a fuel source pump or from an electrolysis module into the fuel storage container.

The control module may be configured to control the flow of the first fuel from the fuel storage container to the fuel cell. For instance, the control module may control an on/off state of the flow of the first fuel along the pipes. The control module may also control and regulate a flow rate and/or a flow pressure of the first fuel through the pipes. The control module may control a flow rate and/or flow pressure of the first fuel along a continuous spectrum, or at one or more predefined fuel flow levels. The control module may comprise a controller configured to control a plurality of gas flow control valves to control the flow of the first fuel, as described in further detail with reference to FIG. 3.

The control module may provide signals that may control flow of fuel at any juncture from the fuel bag to the fuel cell, or from the fuel injection port to the fuel bag or fuel cell. For instance, the control module may control flow from the fuel bag to a distribution pipe or other type of pipe, or from a distribution pipe to a main pipe, or along a main pipe, or between a main pipe and a fuel cell, or between an injection port and a main pipe. The control module may control flow of fuel, which may affect direction of fuel flow. For instance, when fuel is being provided through a fuel injection port, the fuel may flow from the fuel injection port to a main pipe (and optionally one or more distribution pipes) to a fuel bag, to fill the fuel bag. When the fuel cell is producing electricity, fuel may be flowing from the fuel bag to one or more pipes (e.g., distribution pipe to main pipe) to the fuel cell.

The fuel cell may be configured to receive the first fuel from the fuel storage container via the main fuel pipe. The fuel cell may be further configured to receive a second fuel. The second fuel may be oxygen provided in a gaseous state or a liquid state. The second fuel may be delivered to the fuel cell via an inlet hole 231 in the fuel cell. In some embodiments, the second fuel may be delivered from the ambient environment to the fuel cell. The second fuel may be delivered via forced airflow through the inlet hole. The airflow may be forced into the fuel cell with aid of one or more propulsion units of the UAV. The ambient air may include oxygen that may be used by the fuel cell as the second fuel.

The fuel cell is configured to generate electricity, by reacting the first fuel with the second fuel through an electrochemical reaction. The first fuel may be from the fuel storage container. The second fuel may be from the ambient air. Alternatively, the second fuel may be provided from a storage container (e.g., oxygen tank or bag). Electrical contacts are provided to connect the electrical output of the fuel cell to a device 250. The device may be the vehicle. For instance, the device may be the UAV. In some embodiments, the device may also be a component on-board the vehicle. For instance, the device may comprise one or more propulsion units and/or a power consuming unit of the UAV. The device may optionally be an energy storage unit of the UAV (e.g., battery). In some embodiments, a sensor may be electrically connected to the fuel cell, and configured to dynamically detect and record the electrical output of the fuel cell.

In some instances, the fuel cell may operate in accordance with a need or demand by the UAV. For instance, when power consuming units of the UAV demand more energy, the fuel cell may work to produce more energy. In such situations, the fuel cell may consume fuels at a faster rate. When less energy demand is provided on-board the UAV, the fuel cell may produce less energy. For instance, the fuel cell may consume fuels at a slower rate. Alternatively, the fuel cell may consume fuel independent of an energy demand.

The power consuming unit may be a non-propulsion unit of the UAV. The power consuming unit may be one or more components able to collect and/or store information. It may be desirable to provide continuous power to the power consuming unit for constant information processing, retrieval, or storage. The power consuming unit may be one or more of the following controllers (i.e. control units) communication unite, navigation unit, emitter (e.g. light or audio emitter), and/or sensors. Examples of sensors may include but are not limited to location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The electrochemical reaction in the fuel cell may generate a byproduct. The byproduct may be a liquid. When the first fuel is hydrogen and the second fuel is oxygen, water may be generated as the byproduct of the electrochemical reaction. The byproduct may be discharged from the fuel cell via a drain vent 232 in the fuel cell. The byproduct may add to the load of the UAV if it is not removed from the UAV. An added load to the UAV may increase the weight of the UAV and reduce a range of the UAV. As described later in the specification, various embodiments of the invention provide for the removal of the byproduct from the UAV, to reduce the load and increase flight time of the UAV. The byproduct may be removed via evaporation using forced convection. Ventilation may be provided that may aid in the forced convection and/or removal of the byproduct. A benign byproduct, such as water, may be safely dispersed to an environment. Alternatively, the byproduct may be removed by subjecting the byproduct to electrolysis to cause the byproduct to decompose into its elements. The electrolysis of the byproduct may also be used to generate additional first fuel for the fuel cell.

Heat may be generated by the fuel cell since the electrochemical reaction is usually exothermic. The heat may affect the performance/reliability of the fuel cell, as well as other internal components of the UAV. As described later in the specification, various embodiments of the invention provide for removal of heat from the cell, to regulate the working temperature of the fuel cell and to improve the performance/reliability of the fuel cell. The heat may be removed by applying forced convection to evaporate the byproduct to cool the fuel cell. Ventilation may be provided that may aid in the forced convection and/or removal of the heat.

Figure 3:
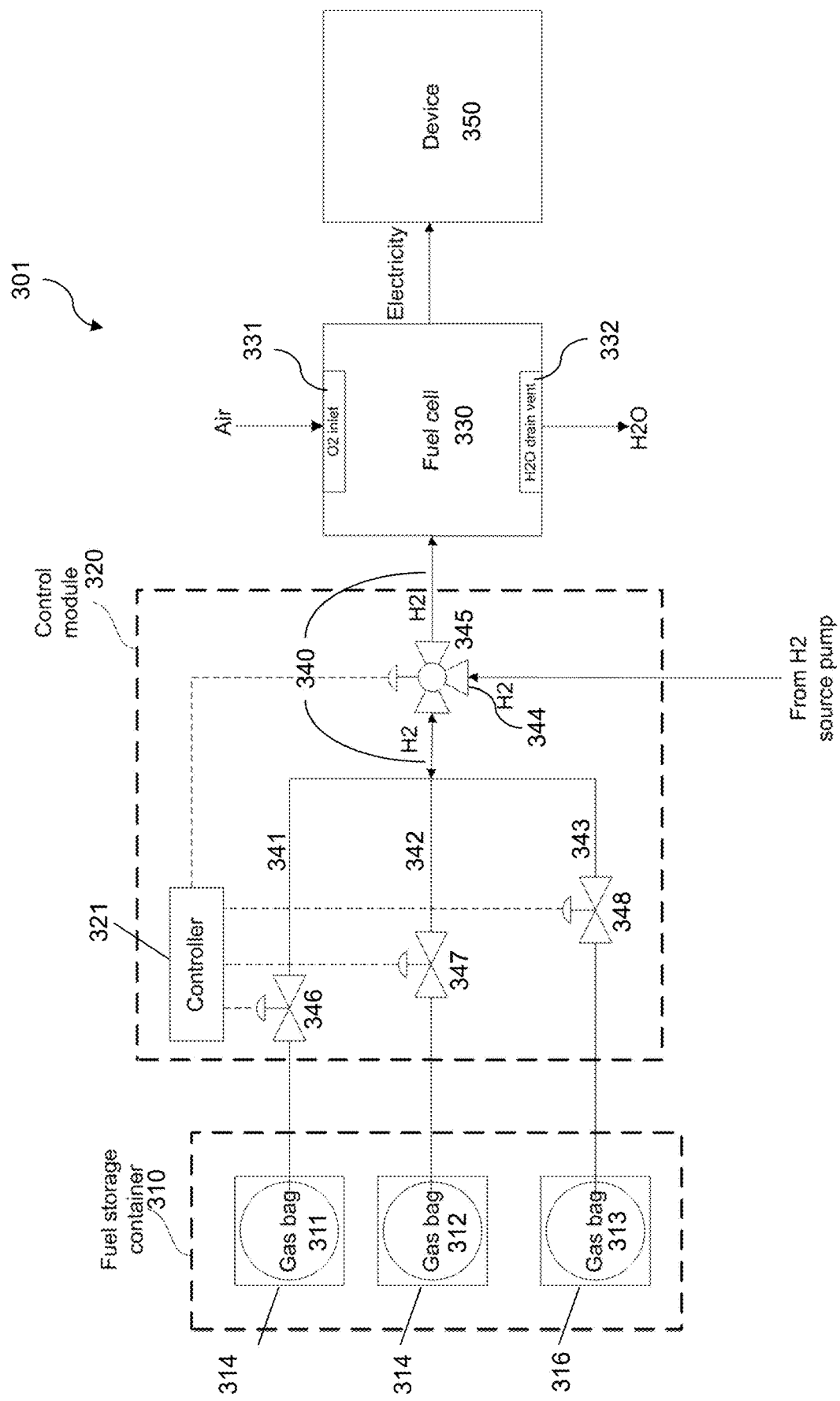
FIG. 3 illustrates a schematic diagram of the fuel cell system of FIG. 2 in further detail, in accordance with some embodiments.

FIG. 3 illustrates a schematic diagram of the fuel cell system of FIG. 2 in further detail. Referring to FIG. 3, the fuel cell system 301 comprises the fuel storage container 310, the control module 320, and the fuel cell 330. The fuel cell system may be provided on a UAV, and may be used to power the UAV. The fuel storage container may be connected to the fuel cell via the plurality of pipes.

In the embodiment of FIG. 3, the first fuel may be hydrogen gas (H2) and the second fuel may be oxygen gas (O2). The fuel cell is configured to generate electricity, by reacting hydrogen gas from the fuel storage container with oxygen gas through an electrochemical reaction. The oxygen gas may be obtained from air from the ambient environment.

The fuel storage container may comprise one or more gas bags for storing hydrogen gas. Any number of gas bags may be provided in the fuel storage container. For instance, as shown in FIG. 3, the fuel storage container 310 comprises a plurality of gas bags 311, 312, and 313 for storing hydrogen gas. The gas bag may be a conformable bag having a chamber for storing hydrogen gas. The gas bag may be formed from a flexible material such as a light-weight polymer. The light-weight polymer may include polyester, polyester fiber, mylar, or reinforced nylon.

The material of the gas bag may have a modulus of about 160 g/D. In some embodiments, the modulus of the gas bag material may be less than 160 g/D. For example, the modulus may be less or equal to about: 160 g/D, 150 g/D, 140 g/D, 130 g/D, 120 g/D, 110 g/D, 100 g/D, 90 g/D, 80 g/D, 70 g/D, 60 g/D, 50 g/D, 40 g/D, 30 g/D, 20 g/D, or 10 g/D. In some other embodiments, the modulus of the gas bag material may be greater than 160 g/D. For example, the modulus may be greater than or equal to about: 160 g/D, 170 g/D, 180 g/D, 190 g/D, 200 g/D, 210 g/D, 220 g/D, 230 g/D, 240 g/D, 250 g/D, or 260 g/D.

The material of the gas bag may have a strain of about 150%. In some embodiments, the strain may be less than 150%. For example, the strain may be less or equal to about: 150%, 140%, 130%, 120%, 110%, or 100%. In some other embodiments, the strain may be greater than 150%. For example, the strain may be greater than or equal to about: 150%, 160%, 170%, 180%, or 200%.

The gas bag may be flame-resistant since hydrogen gas is highly combustible. In some embodiments, the gas bag may be formed of multiple layers comprising an inner layer and a shell layer. The inner layer may be disposed on an inner wall of the chamber, and the shell layer may be disposed on an outer wall of the chamber, such that the shell layer is placed over the inner liner. The inner liner may be formed of a high-molecular-weight polymer and serves as a barrier to prevent hydrogen gas from permeating out of the gas bag. The shell layer serves as a pressure load-bearing component of the gas bag and provides light-weight structural reinforcement. In some embodiments, the shell layer may be made of an elastic carbon fiber-epoxy resin composite. A thickness of the shell layer may be equal to or greater than a predetermined thickness to prevent the shell layer from rupturing under highly pressurized hydrogen gas. The thickness of the shell layer may be designed such that the gas bag remains elastic and conformable under the high pressures.

In some particular embodiments, the fuel storage container may be formed from a rigid material. For instance, the fuel storage container may be a structurally rigid tank having a chamber for storing hydrogen gas.

In some embodiments, the fuel storage container may further comprise a storage case for each gas bag. For instance, storage cases 314, 315, and 316 may be provided respectively for the gas bags 311, 312, and 313. The gas bag is configured to be disposed inside the storage case. The storage case may be located on a vehicle, and may be integrally connected to the housing or body of the vehicle. The storage case serves to protect the bag from external impact and damage. The storage case may be made of a light-weight material formed from a rigid material. The gas bag may conform to an interior space of the storage case when hydrogen gas is being stored in the gas bag. An interior space of the storage case may have a symmetric shape. In some particular embodiments, the interior space of the storage case may have an irregular shape. A maximum volume of the gas bag may be determined based on a maximum volume of the interior space of the storage case. An outer surface of the gas bag may be in contact with inner walls of the storage case when the bag is at its maximum volume. A volume of the gas bag increases when hydrogen gas is stored in the gas bag. In some embodiments, the storage case may be partially filled with an inert gas (e.g., helium) to reduce the risk of explosion since hydrogen gas is highly flammable.

The plurality of pipes define a flow path for hydrogen gas from the fuel storage container to the fuel cell. The plurality of pipes comprise a main fuel pipe 340, and a plurality of distribution pipes 341, 342, and 343. Each distribution pipe is connected to a corresponding gas bag. For instance, as shown in FIG. 3, the distribution pipe 341 is connected to the gas bag 311 so that hydrogen gas from the gas bag 311 may flow along the distribution pipe 341. Similarly, the distribution pipe 342 is connected to the gas bag 312 so that hydrogen gas from the gas bag 312 may flow along the distribution pipe 342. Likewise, the distribution pipe 343 is connected to the gas bag 313 so that hydrogen gas from the gas bag 313 may flow along the distribution pipe 343. The distribution pipes are connected to the main fuel pipe which is directly connected to the fuel cell. The plurality of pipes may be provided in the form of hoses, air ducts, tubings, gas pipes, etc. The pipes may be made of an appropriate plastic or metal material that is chemically resistant to hydrogen (i.e., does not react with hydrogen), and that enables laminar flow of hydrogen gas through the pipes.

A plurality of gas flow control valves may be configured to control flow of the first fuel (e.g., hydrogen gas) between the gas bag and the fuel cell. In some instances, each gas flow control valve may function as a gating mechanism for the flow of fuel gas from the gas bag to the fuel cell. The gas flow control valve may have an open position that permits fuel gas to flow between the gas bag and the fuel cell. When the gas flow control valve is in the open position, fluid communication may be provided between the gas bag and the fuel cell. The gas flow control valve may have a closed position that may prevent fuel gas from flowing between the gas bag and the fuel cell. When the gas flow control valve is in the closed position, fluid communication is not provided between the gas bag and the fuel cell.

For example, as shown in FIG. 3, a main gas flow control valve 345 may be provided along the main pipe 340, and a plurality of gas flow control valves 346, 347, and 348 may be provided respectively along the distribution pipes 341, 342, and 343. The main gas flow control valve 345 may be connected between the fuel cell and the fuel cell storage container. The plurality of gas flow control valves 346, 347, and 348 may be provided between the main gas flow control valve 345 and the fuel cell storage container. The opening/closing of the control valves may be controlled by the controller 321 in the control module. The controller may be configured to provide a plurality of fuel flow control signals to control the opening/closing of the control valves 345, 346, 347, and 348 associated with the respective pipes for flow control thereto. For instance, the controller may control an on/off state of the flow of hydrogen gas along the main fuel pipe and along each distribution pipe. The controller may also control and regulate a flow rate and/or a flow pressure of hydrogen gas through the main fuel pipe and the distribution pipes.

The controller may control the gas flow control valves, the gas flow control valves controlling whether hydrogen gas will flow into the fuel cell, as well as the flow rate, pressure and amount of hydrogen gas flowing into the fuel cell. The controller may generate a signal that may be provided to the gas flow control valve to indicate whether to open or close the gas flow control valve, or optionally the degree to which the gas flow control valve may be opened. The controller may be in communication with an aircraft control mechanism that may control other functions of the aerial vehicle, such as propulsion, guidance, sensors, or communications. Alternatively, the controller that provides the signal the gas flow control valve may be the aircraft control mechanism itself. The controller may be on-board the aircraft. Alternatively, the controller may be a device or part of a device external to the aircraft. The controller may include a processor that may perform one or more steps in accordance with non-transitory computer readable media that may define operation of the aerial vehicle. The processor may determine, based on data, whether to send the signal to the gas flow control valve, or the type of signal to be sent. The processor may make this determination in accordance with calculations performed on the data or a subset of the data. The controller may have one or more memory units that may include non-transitory computer readable media that may comprise code, logic, or instructions for performing the one or more steps. The processor may generate a signal indicative that the aircraft is to be powered, which may be used to open a gas flow control valve. The signal may be generated on-board the aerial vehicle or may be generated from an external device in communication with the aerial vehicle.

In one example, the controller may receive data from one or more sensors, or from another aircraft controller. Based on the data received by the controller, the controller, with aid of a processor, may generate a signal that it may send to a gas flow control valve. In some instances, the signal may cause a gas flow control valve to open from a closed state. The signal may or may not dictate the degree to which the gas flow control valve is opened. In some instances, the signal may cause a gas flow control valve to close from an open state. In some embodiments, a default setting may be for a gas flow control valve to be open during operation of the aerial vehicle. Once the gas flow control valve has opened, it may remain opened as long as the vehicle continues to be powered by the fuel cell. Conversely, the gas flow control valve may be closed when the vehicle lands, or in the event of a detected malfunction or other type of specified event. The detected malfunction may include hydrogen gas leak, fuel cell overheating, and other abnormal events associated with operation of the fuel cell system or the vehicle.

In some instances, a gas flow control valve may have a binary open and closed position. Alternatively, a gas flow control valve may be a proportional valve that may control the flow rate of the gas that flows between the gas bag and the fuel cell. For example, a proportional valve may have a wide open configuration that may permit a greater rate of flow than a partially open configuration that may permit a lesser rate of flow. Optionally, regulating, throttling, metering or needle valves may be used. Return or non-return valves may be used. A valve may have any number of ports. For example, a two-port valve may be used. Alternatively, a three-port, four-port or other type of valve may be used in alternative configurations. Any description herein of valves may apply to any other type of flow control mechanism. The flow control mechanisms may be any type of binary flow control mechanism (e.g., containing only an open and closed position) or variable flow control mechanism (e.g., which may include degrees of open and closed positions).

Prior to providing the hydrogen gas to the fuel cell, all of the gas flow control valves may be closed. The gas bag may contain the hydrogen gas therein, which may be prevented from flowing to the fuel cell by the closed gas flow control valves. A signal may be provided from the controller to each gas flow control valve that may cause the gas flow control valve to open. In some instances, signals to open the gas flow control valves may be provided when the aerial vehicle is about to take flight. The signals may also be generated when one or more propulsion units of the vehicle are to be powered, and/or when other non-propulsion components of the vehicle are to be powered. When the gas flow control valves are opened, the hydrogen gas may flow from the gas bag to the fuel cell so that electricity can be generated to power the vehicle. The hydrogen gas may be rapidly provided to the fuel cell. In some instances, the hydrogen gas from the gas bag may reach the fuel cell within 0.01 seconds, 0.05 seconds, 0.1 seconds, 0.2 seconds, 0.3 seconds, 0.4 seconds, 0.5 seconds, 0.6 seconds, 0.7 seconds, 0.8 seconds, 0.9 seconds, 1 second, 1.2 seconds, 1.5 seconds, 2 seconds, 3 seconds, or 5 seconds. The amount, flow rate and/or pressure of the hydrogen gas to the fuel cell may be controlled using the controller to control one or more of the gas flow control valves.

In some embodiments, the fuel injection port 344 may be provided along the main fuel pipe. For instance, the fuel injection port may be provided between the fuel storage container and the fuel cell. The fuel injection port may be provided at the main gas flow control valve 345. The fuel injection port may be configured to accept hydrogen gas to fill the fuel storage container. For instance, the fuel injection port may accept hydrogen gas from a H2 source pump to fill one or more gas bags. In some embodiments, the fuel injection port may be connected to a fuel injection pipe that extends to an outer surface of the body of the UAV. Hydrogen gas may be initially supplied to the fuel storage container via the fuel injection port/pipe until a pressure of the hydrogen gas in the fuel storage container reaches a predetermined pressure threshold. The controller may be configured to monitor the pressure of hydrogen gas and to shut off the supply of hydrogen gas to the fuel storage container via one or more control valves 345, 346, 347, and 348 when the pressure of hydrogen gas reaches the predetermined pressure threshold.

In some embodiments, the predetermined pressure is defined such that an outer surface of the gas bag is in contact with inner walls of the storage case when the gas bag is filled with hydrogen gas. In some other embodiments, the predetermined pressure is defined such that an outer surface of the gas bag is about to contact the inner walls of the storage case when the gas bag is filled with hydrogen gas. In some further embodiments, the predetermined pressure is defined such that an outer surface of the gas bag contacts the inner walls of the storage case for an amount of time when the gas bag is being filled with hydrogen gas. The pressure of the hydrogen gas may be monitored using one or more gas pressure sensors located in the gas bags or along the pipes. For instance, a gas pressure sensor may be located along the pipes after each control valve. The gas pressure sensors provide feedback to the controller in the control module. Contact between the outer surface of the gas bag and the inner walls of the storage case may be monitored using contact and/or proximity sensors located on the inner walls of the storage case. The fuel storage container may be configured to store hydrogen gas and permit the hydrogen gas to reach the predetermined pressure with less than a 0.01% leakage per minute. The predetermined pressure may be about 800 MPa. In some embodiments, the predetermined pressure may be less than 800 MPa. For example, the predetermined pressure may be less than or equal to about: 800 MPa, 700 MPa, 600 MPa, 500 MPa, 400 MPa, 300 MPa, 200 MPa, 100 MPa, 50 MPa, 10 MPa, or 1 MPa. In some other embodiments, the predetermined pressure may be greater than 800 MPa. For example, the predetermined pressure may be greater than or equal to about: 800 MPa, 900 MPa, 1000 MPa, 1100 MPa, 1200 MPa, 1300 MPa, 1400 MPa, or 1500 MPa.

In some embodiments, the fuel storage container may generate a lift force when the hydrogen gas is stored in the fuel storage container, since the density of hydrogen gas in the fuel storage container may be substantially lower than the density of air outside the fuel storage container. The lift force can provide lift (aerostatic lift) to the UAV. The pressure of hydrogen gas in the fuel storage container may be provided below a neutral buoyancy pressure such that the fuel storage container may attain a lighter-than-air state to generate the lift force. The pressure of hydrogen gas in the fuel storage container may change as hydrogen gas is being consumed by the fuel cell through the electrochemical reaction between hydrogen and oxygen. To counter the change in pressure, a pump may be provided along one or more pipes to control and regulate the pressure of hydrogen gas in the fuel storage container. The pump may be configured to pump hydrogen gas from a hydrogen gas source pump or from an electrolysis module into the fuel storage container.

The neutral buoyancy pressure for a given volume of hydrogen gas may be calculated using the ideal gas law equation: $PV=nRT$, where P is the pressure of gas, V is the volume of gas, n is the number of moles, R is the universal gas constant, and T is the temperature of the gas. The gas bag may hold highly-compressed hydrogen (e.g. provided from a supply cylinder or the hydrogen gas source pump), yet has negligible weight. The temperature increase of the compressed gas may be ignored by assuming that the fuel storage container has an efficient cooling system such that the temperature delta is negligible. At Standard Temperature Pressure (STP, 273K, 100 kPa), one liter of volume filled with hydrogen gas contains: $100=(n*8.3145*273)/10 => n=0.441$ mol. With hydrogen having a molar weight of 1.00794 g/mol (and H2 gas having double that molar weight), the density in g/L of hydrogen gas at STP is 0.08890 g/L. The density of air at STP is 1.225 g/L (1m3=1000 L). Accordingly, the neutral buoyancy pressure for a gas bag of negligible mass holding enough compressed hydrogen to not float in air is 1377.953 kPa (199.855 psi). When the pressure of the hydrogen in the gas bag is less than 199.855 psi, the gas bag would rise. Conversely, when the pressure of the hydrogen in the gas bag is greater than 199.855 psi, the gas bag would sink in air and not be neutrally buoyant.

The control module may be configured to control the flow of hydrogen gas from the fuel storage container to the fuel cell. For instance, the controller in the control module may control an on/off state of the flow of hydrogen gas along the pipes via the control valves. The controller may also control and regulate a flow rate and/or a flow pressure of hydrogen gas along the pipes via the control valves.

The fuel cell may be configured to receive hydrogen gas from the fuel storage container via the main fuel pipe. The fuel cell may be further configured to receive oxygen gas. The oxygen gas may be delivered to the fuel cell via the inlet hole 331 in the fuel cell. In some embodiments, oxygen gas may be delivered from the ambient environment to the fuel cell via forced airflow through the inlet hole. The airflow may be forced into the fuel cell with aid of one or more propulsion units of the UAV.

The fuel cell is configured to generate electricity, by reacting hydrogen gas from the fuel storage container with oxygen gas from the ambient environment through an electrochemical reaction. Electrical contacts are provided to connect the electrical output of the fuel cell to the device 350. The device may be a vehicle. For instance, the device may be the UAV. In some embodiments, the device may also be a component on-board the vehicle. For instance, the device may comprise one or more propulsion units and/or a power consuming unit of the UAV. In some embodiments, a sensor may be electrically connected to the fuel cell, and configured to dynamically detect and record the electrical output of the fuel cell.

The electrochemical reaction between hydrogen and oxygen gas in the fuel cell generates water as a byproduct. The water may be discharged from the fuel cell via the drain vent 332 in the fuel cell. The water may add to the load of the UAV if it is not removed from the UAV. As described later in the specification, various embodiments of the invention provide for the removal of the water byproduct from the UAV, to reduce the load and increase flight time of the UAV. The water may be removed via evaporation using forced convection. Alternatively, the water may be removed by subjecting the water to electrolysis to cause the water to decompose into its elements (hydrogen and oxygen). The electrolysis of the water may also be used to generate additional hydrogen gas for the fuel cell.

Heat may be generated by the fuel cell since the electrochemical reaction between hydrogen and oxygen in the fuel cell is exothermic. The heat may affect the performance/reliability of the fuel cell, as well as other internal components of the UAV. As described later in the specification, various embodiments of the invention provide for the removal of heat from the fuel cell, to regulate the working temperature of the fuel cell and to improve the performance/reliability of the fuel cell. The heat may be removed by applying forced convection to evaporate the water byproduct to cool the fuel cell.

Figure 4:
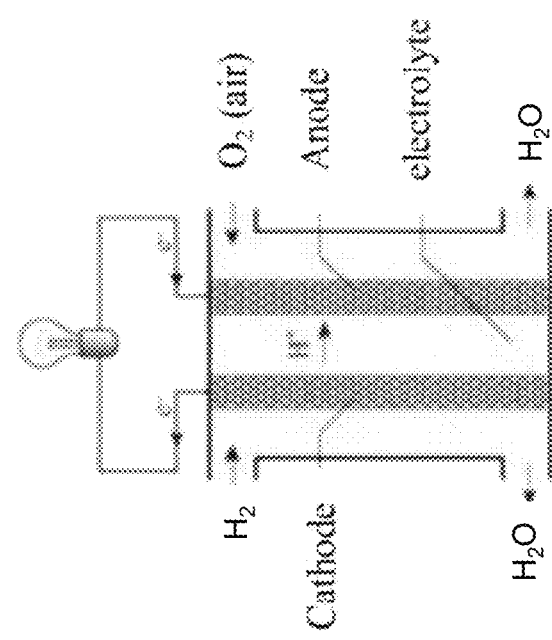
FIG. 4 illustrates an exemplary fuel cell.

FIG. 4 illustrates a fuel cell in accordance with some embodiments. Referring to FIG. 4, the fuel cell may be a proton-conducting fuel cell. The fuel cell comprises a cathode, an anode, and an electrolyte. The fuel cell may be configured to receive hydrogen gas as the first fuel and oxygen gas as the second fuel. The hydrogen gas may be provided from the fuel storage container. The oxygen gas may be obtained from air in the ambient environment. The electrolyte allows positively charged hydrogen ions (or protons) to move between the two sides of the fuel cell. The anode and cathode contain catalysts that cause the fuel to undergo oxidation reactions that generate positive hydrogen ions and electrons. The hydrogen ions are drawn through the electrolyte after the reactions. At the same time, electrons are drawn from the anode to the cathode through an external circuit, producing direct current electricity. At the cathode, hydrogen ions, electrons, and oxygen react to form water. In some embodiments, to deliver the desired amount of energy, a plurality of fuel cells can be combined in series to yield higher voltage, or in parallel to allow a higher current to be supplied. Such a design (combination of fuel cells in series or parallel) is called a fuel cell stack. The cell surface area can also be increased, to allow higher current from each cell. The fuel cell may be provided in different designs and configurations, for example, proton exchange membrane fuel cells (PEMFCs), molten carbonate fuel cell (MCFC), phosphoric acid fuel cell (PAFC), solid oxide fuel cell (SOFC), etc.

Figure 5:
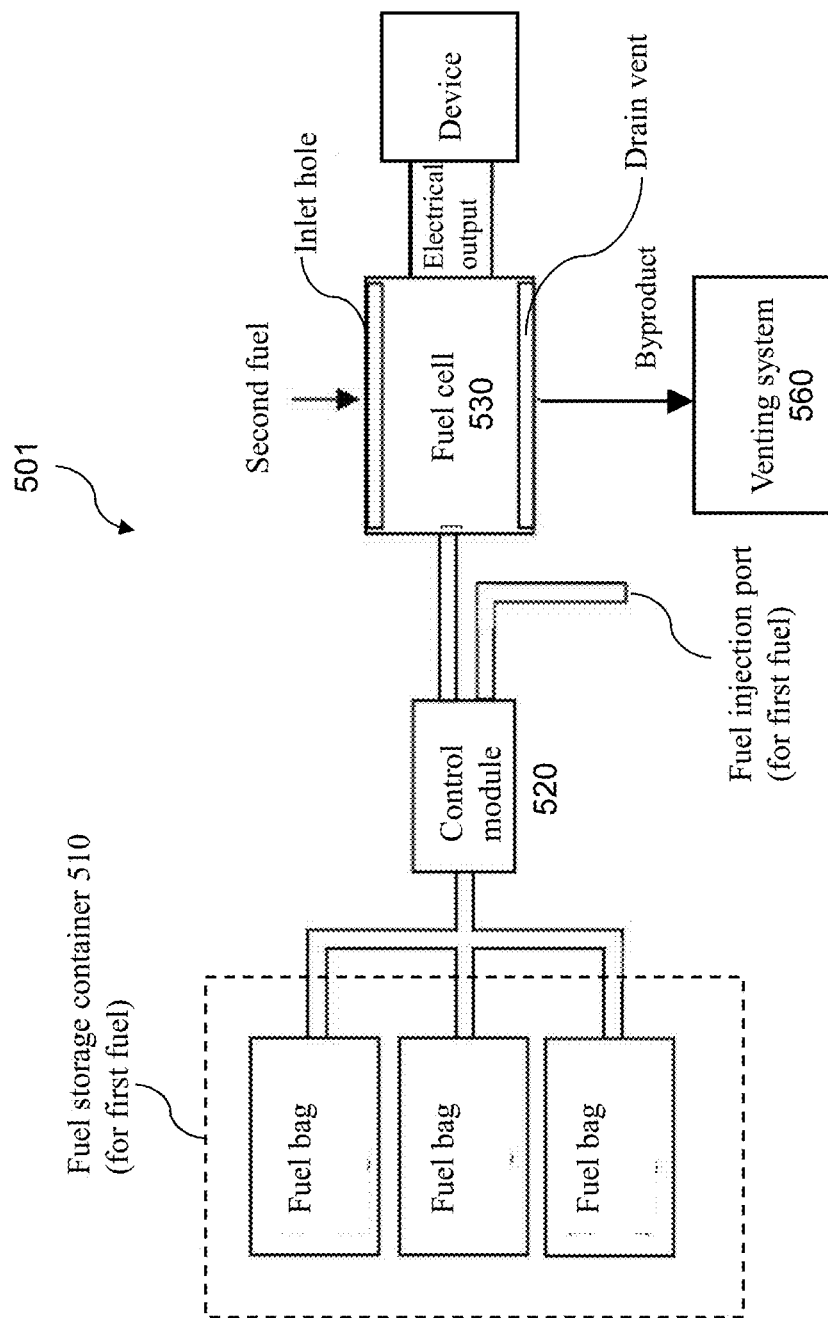
FIG. 5 illustrates a fuel cell system in accordance with another embodiment.

FIG. 5 illustrates a fuel cell system in accordance with another embodiment. Referring to FIG. 5, the fuel cell system 501 comprises the fuel storage container 510, the control module 520, and the fuel cell 530. The fuel cell system may be provided on a UAV, and may be used to power the UAV. The fuel cell system 501 of FIG. 5 is similar to the fuel cell system 201 of FIG. 2 except for the following differences. In the embodiment of FIG. 5, the fuel cell system 501 further comprises a venting system 560 for removing the byproduct of the fuel cell electrochemical reaction. The venting system may be configured to expose the byproduct to forced convection (forced airflow), so as to remove the byproduct from the UAV. The venting system may provide fluid communication between the byproduct and an ambient environment around the UAV. Having the venting system may increase the rate at which the byproduct may be removed. For instance, the rate of byproduct removal may be increased by at least 1%, 3%, 5%, 7%, 10%, 15%, 20%, 25%, 30%, 40%, 50%, 60%, 70%, 80%, 90%, 100%, or 200% of the rate of byproduct removal without venting. The venting system will be described below with reference to FIG. 6 which illustrates a schematic diagram of the fuel cell system of FIG. 5 in further detail.

Figure 6:
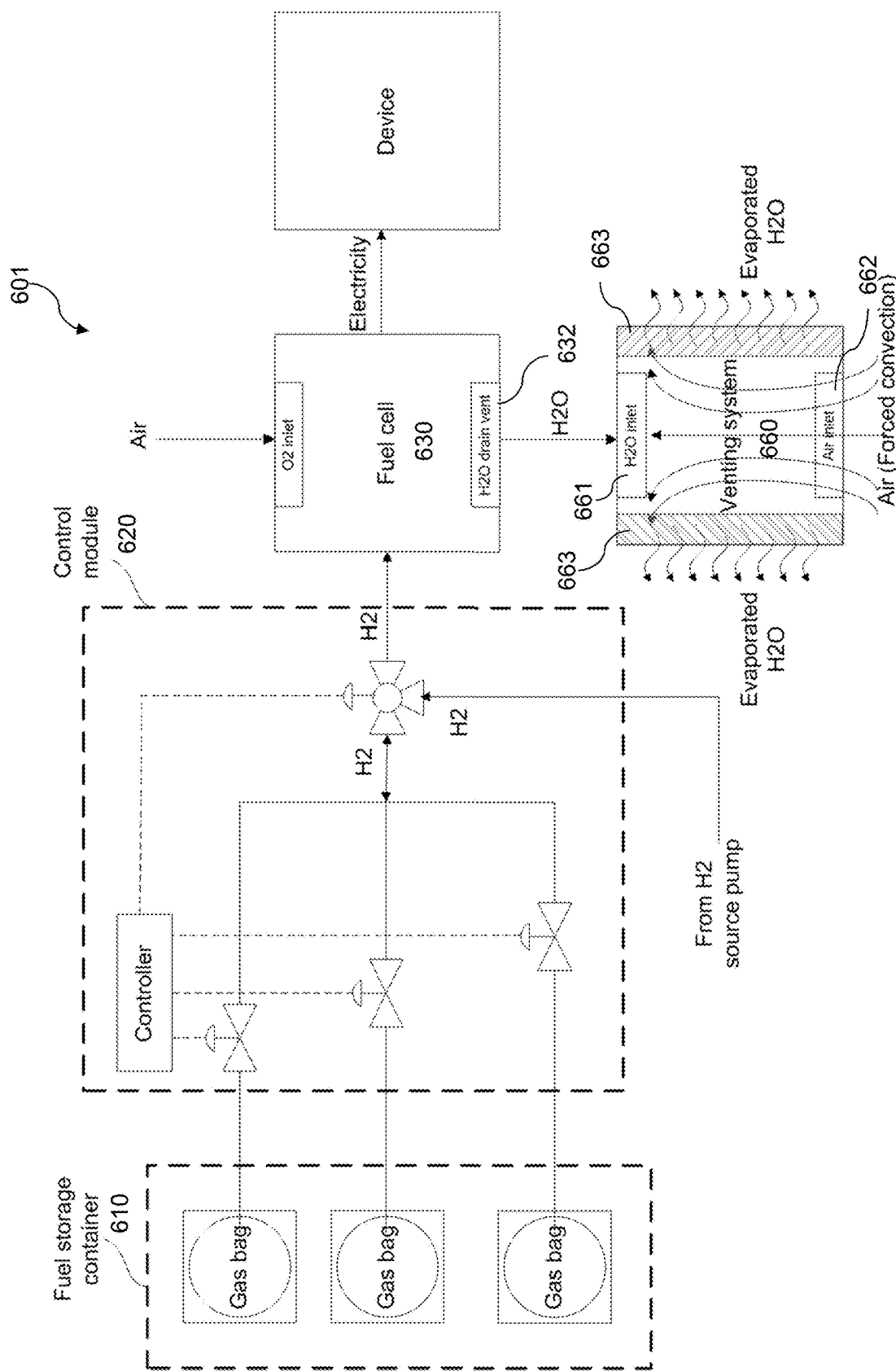
FIG. 6 illustrates a schematic diagram of the fuel cell system of FIG. 5 in further detail, in accordance with some embodiments.

Referring to FIG. 6, the fuel cell system 601 comprises the fuel storage container 610, the control module 620, the fuel cell 630, and the venting system 660. The fuel cell system may be provided on a UAV, and may be used to power the UAV. The fuel storage container may be connected to the fuel cell via the plurality of pipes.

In the embodiment of FIG. 6, the first fuel may be hydrogen gas (H2) and the second fuel may be oxygen gas (O2). The electrochemical reaction between hydrogen and oxygen gas in the fuel cell generates water as the byproduct. The water may be discharged from the fuel cell to the venting system 660 via the drain vent 632 in the fuel cell. The venting system may include a H2O inlet 661 to receive the water from the fuel cell. In some embodiments, a pipe may be connected between the drain vent and the H2O inlet to allow water from the fuel cell to flow into the venting system.

The venting system may be configured to evaporate and remove the water from the UAV using forced convection. The water may be exposed to forced convection in the venting system. The forced convection may be generated with aid of one or more propulsion units of the UAV that generates airflow over the water. The forced convection may alternatively be generated with aid of one or more internal fans or pumps. Energy may be consumed by one or more power consumption unit in the production of the forced convection. In some instances, convection may occur within the UAV due to inflow of air at an air inlet hole, and exiting of air due at an air exhaust vent. The airflow may be provided into the venting system through one or more air inlet holes 662. The one or more propulsion units may include a rotor/propeller of the UAV. The propulsion units of the UAV may force air from the ambient environment into an arm of the UAV through the air inlet hole. The propulsion units may force the air to flow along the arm of the UAV to a central cavity of the UAV where the fuel cell and water byproduct are stored. The water is evaporated by the airflow and discharged through one or more air exhaust vents 663. The air inlet hole and the air exhaust vent may be provided on the body or housing of the UAV. The water may be removed from the UAV to reduce a weight of the UAV. The water may be removed by the evaporation, dumping of water through one or more holes in the housing, or any combination of both. The weight of the UAV may be reduced to decrease an amount of power needed to power the UAV, so as to increase a flight time and range of the UAV.

The forced convection may cause air to flow over the byproduct at a rapid rate. For instance, the forced convection may cause forced airflow over the byproduct at a speed of at least 5 cm/s. 10 cm/s, 15 cm/s, 20 cm/s, 25 cm/s, 30 cm/s, 40 cm/s, 50 cm/s, 60 cm/s, 70 cm/s, 80 cm/s, or 100 cm/s. The forced airflow may be within a housing of the UAV. The direction of the forced airflow may be substantially parallel to a surface of the byproduct. Alternatively, the direction of the forced airflow may be substantially perpendicular to the surface, or at any other angle relative to the surface (e.g., about 15 degrees, 30 degrees, 45 degrees, 60 degrees, or 75 degrees.

Figure 7:
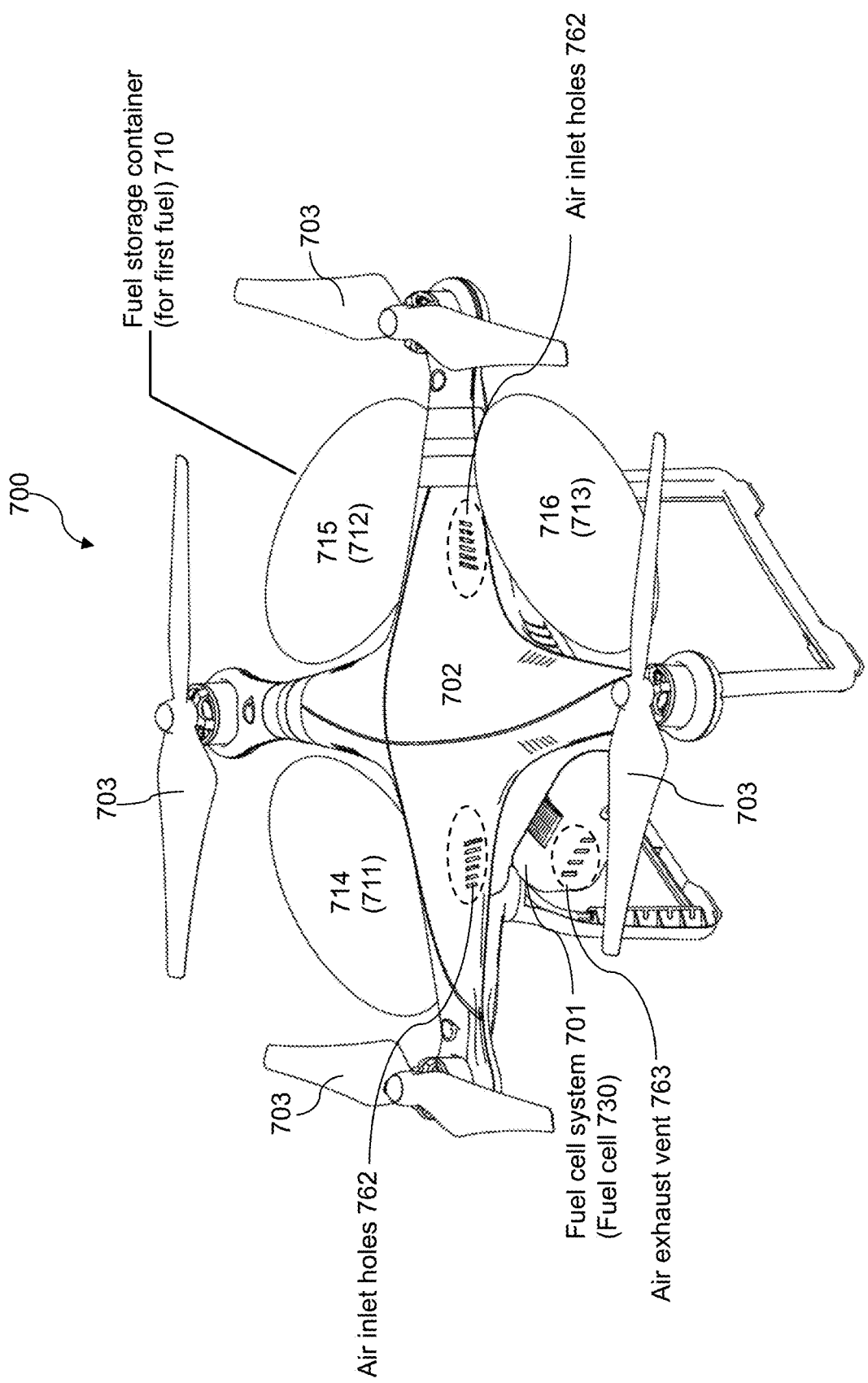
FIG. 7 shows a detailed side view of a UAV comprising a fuel cell system and a venting system, in accordance with some embodiments.

FIG. 7 shows a detailed view of a UAV comprising the fuel cell system having the venting system, in accordance with some embodiments. Referring to FIG. 7, the UAV 700 comprises the fuel cell system 701. The fuel cell system comprises the fuel cell 730 operably connected to the fuel storage container 710. The fuel cell may be disposed in or adjacent to a housing 702 of the UAV. The housing may include a central cavity within a central body of the UAV. The housing may include one or more branch cavities within one or more corresponding arms of the UAV. The central cavity and the one or more branch cavities may be in fluidic communication with one another.

The fuel storage container may be configured to store the first fuel. The fuel storage container may comprise one or more fuel storage cases, such as three fuel storage cases 714, 715, and 716 configured to respectively contain gas bags 711, 712, and 713 therein. The fuel storage cases may be attached onto the body or housing of the UAV. The density of hydrogen gas in the fuel storage container may be substantially lower than the density of air surrounding the UAV. Accordingly, when the gas bags are filled with hydrogen gas, a lift force to the UAV may be generated, which may lower the load and increase flight time of the UAV. In some alternate embodiments, gas bags may be directly provided without requiring additional fuel storage cases. The external surface of the gas bags may be directly exposed to the ambient environment.

The gas bags may be located anywhere on the UAV. In some instances, the gas bags may be located outside a housing of the UAV. The gas bags may be located at or near a central body of the UAV. The gas bags may be located along a side surface of the central body, bottom surface of the central body, and/or top surface of the central body. The gas bag s may be located on or near one or more arms of the UAV. In some embodiments, the gas bags may be located on side surface of the central body between arms of the UAV. The gas bags and/or fuel storage cases may be designed to not significantly impede the aerodynamics of the UAV. The gas bags and/or fuel storage cases may be designed to not interfere with the rotors of the UAV.

The fuel cell is configured to generate electricity and a byproduct, by reacting the first fuel with a second fuel through an electrochemical reaction. The UAV further comprises the venting system for removing the electrochemical reaction byproduct of the fuel cell. The venting system may be configured to evaporate and remove the byproduct from the UAV using convection. The byproduct may be exposed to forced convection in the venting system. The forced convection may be generated with aid of one or more propulsion units 703 of the UAV that generates airflow over the byproduct. The forced convection may be generated using any other technique described elsewhere herein. The forced convection may force an airflow over the byproduct with aid of one or more power consuming units. In some embodiments, the speed of the airflow may be greater with forced convection than via a natural flow.

The venting system may comprise one or more air inlet holes 762 and one or more air exhaust vents 763. The air inlet hole and the exhaust vent may be provided on the housing of the UAV. The airflow may be directed into the venting system through the air inlet hole. The one or more propulsion units may include a propeller of the UAV. The propulsion units of the UAV may force air from the ambient environment into an arm of the UAV through the air inlet hole. In some embodiments, the air inlet hole may be located on an arm of the UAV. The air inlet hole may be at or near an end of the arm of the UAV (e.g., within 1%, 5%, 10%, 20%, 30%, 40%, or 50% of the distal end of the arm). The air inlet hole may be positioned near the propeller of the UAV (e.g., within 1%, 3%, 5%, or 10% of the length of the arm of the propeller). Alternatively, the air inlet hole need not be near the propeller of the UAV. The propulsion units may force the air to flow along the arm of the UAV to a central cavity of the UAV where the fuel cell and its byproduct are stored. The byproduct may be evaporated by the airflow and discharged through the air exhaust vent. The air exhaust vent may be located on a central body of the UAV. The air exhaust vent may be located near an area where the byproduct may collect (e.g., within 1 cm, 3 cm, 5 cm, or 10 cm). The byproduct may be removed from the UAV to reduce a weight of the UAV. The weight of the UAV may be reduced to decrease an amount of power needed to power the UA, so as to increase a flight time and range of the UAV.

The UAV may have one or more air inlet holes. In some embodiments, each arm may have one or more air inlet holes. The air inlet holes may be openings in an arm housing that may provide fluid communication from an external environment to an interior cavity of the arm. The air inlet holes may be on a side surface, bottom surface, and/or top surface of an arm.

The UAV may have one or more air exhaust vents. In some instances, the central body may have one or more openings that function as the air exhaust vent. The openings may be provided in a central body housing and may provide fluid communication from an interior of a central cavity to the ambient environment. The air exhaust vent may be on a lower surface, side surface, and/or top surface of the central body housing. In some embodiments, more air inlet holes may be provided than air exhaust vents.

When the first fuel is hydrogen gas (H2) and the second fuel is oxygen gas (O2), the electrochemical reaction between hydrogen and oxygen gas in the fuel cell generates water as the byproduct. The water may be evaporated and removed from the UAV by forcing airflow over the water. The airflow may be introduced through an arm of the UAV. The airflow may enter and exit through one or more air inlet holes located on the arm of the UAV. The airflow may enter through the air inlet hole and flow over the water byproduct of the fuel cell to evaporate the water. The evaporated water is then driven out by the airflow to exit the UAV via the air exhaust vent. The air exhaust vent may be located near the portion of the housing where the fuel cell and its water byproduct are stored. The airflow may be driven with aid of one or more propulsion units of the UAV. The one or more propulsion units may include a propeller of the vehicle. In some embodiments, the airflow may be introduced through a central body of the vehicle, whereby the airflow enters through an opening in the central body of the vehicle. The water may be removed from the UAV to the ambient environment by the venting system through the air exhaust vent. The water may be removed from the UAV to reduce a weight of the UAV. The weight of the UAV may be reduced to decrease an amount of power required to power the UAV, so as to increase a flight time of the UAV.

Figure 8:
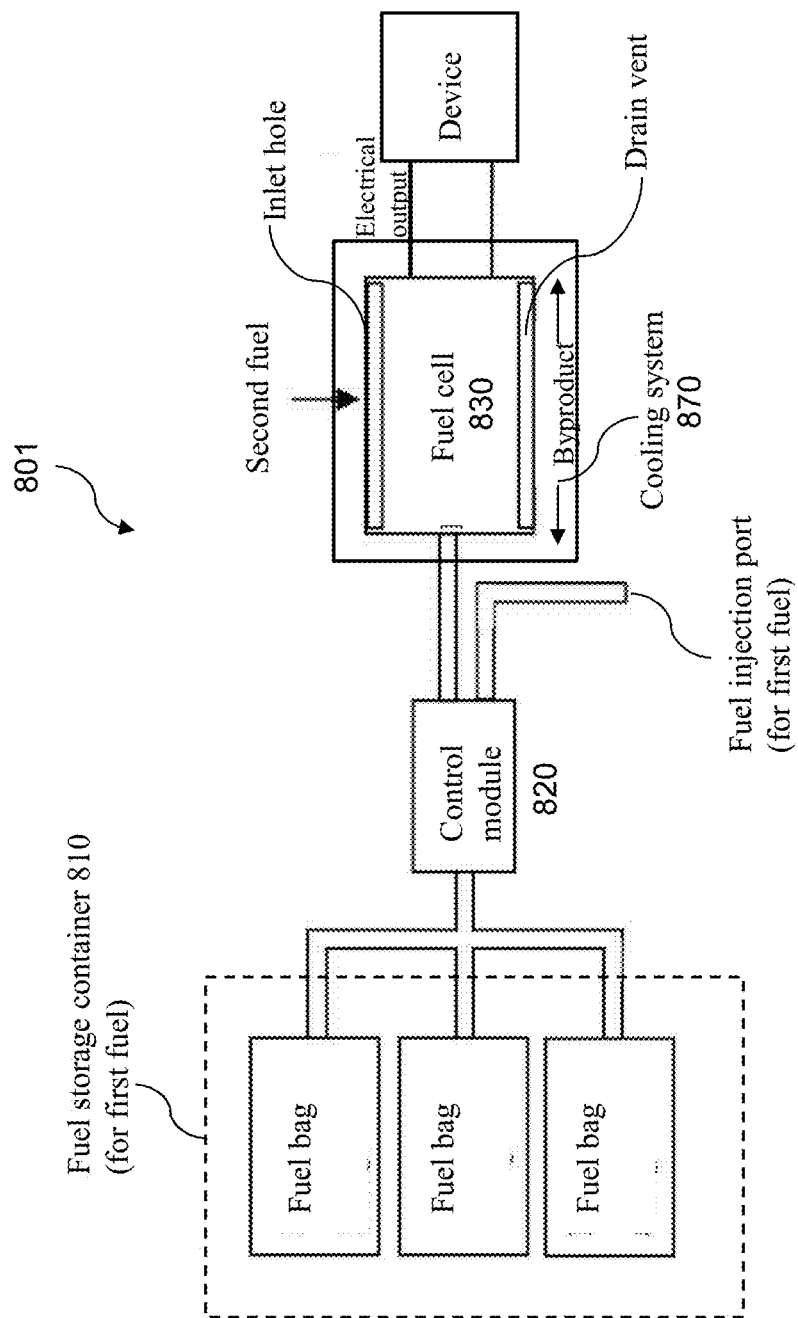
FIG. 8 illustrates a fuel cell system in accordance with a further embodiment.

FIG. 8 illustrates a fuel cell system in accordance with a further embodiment. Referring to FIG. 8, the fuel cell system 801 comprises the fuel storage container 810, the control module 820, and the fuel cell 830. The fuel cell system may be provided on a UAV, and may be used to power the UAV. The fuel cell system 801 of FIG. 8 is similar to the fuel cell system 201 of FIG. 2 except for the following differences. In the embodiment of FIG. 8, the fuel cell system 801 further comprises a cooling system 860 for removing heat from the fuel cell. The cooling system may be configured to effect evaporation of the byproduct of the fuel cell electrochemical reaction. The evaporation of the byproduct may be used to cool the fuel cell. The cooling system will be described below with reference to FIG. 9 which illustrates a schematic diagram of the fuel cell system of FIG. 8 in further detail.

Figure 9:
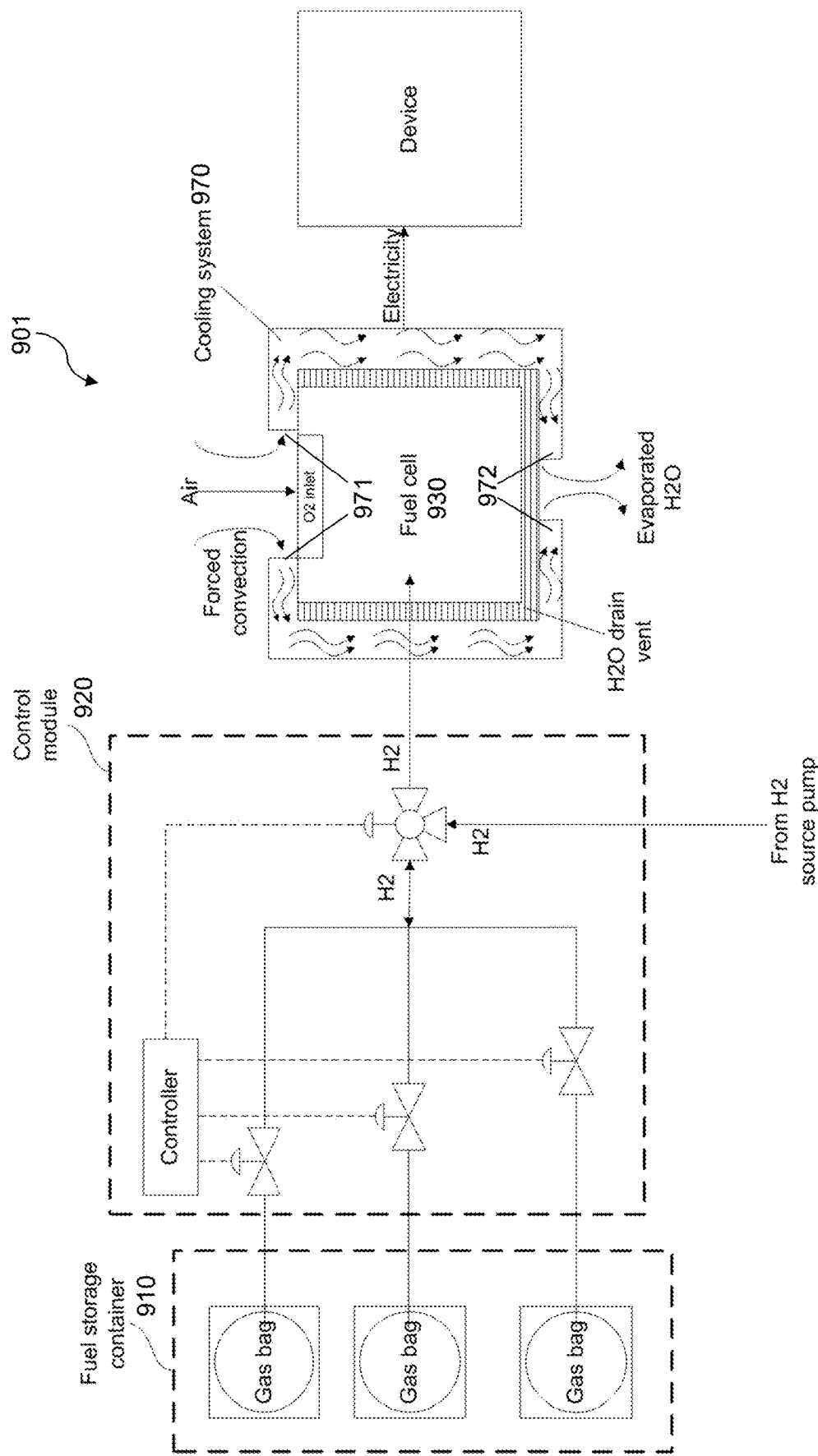
FIG. 9 illustrates a schematic diagram of the fuel cell system of FIG. 8 in further detail, in accordance with some embodiments.

Referring to FIG. 9, the fuel cell system 901 comprises the fuel storage container 910, the control module 920, the fuel cell 930, and the cooling system 970. The fuel cell system may be provided on a UAV, and may be used to power the UAV. The fuel storage container may be connected to the fuel cell via the plurality of pipes.

In the embodiment of FIG. 9, the first fuel may be hydrogen gas (H2) and the second fuel may be oxygen gas (O2). The electrochemical reaction between hydrogen and oxygen gas in the fuel cell generates water as the byproduct. Heat is also generated since the electrochemical reaction between hydrogen and oxygen gas is exothermic. The cooling system 970 may comprise a receptacle in which water from the fuel cell may be collected. The receptacle may be in thermal communication with the fuel cell and may receive the heat generated from the fuel cell via conduction. The cooling system may also comprise one or more openings. The openings may comprise at least one air inlet hole 971 and at least one air exhaust vent 972. The fuel cell may be cooled by forcing airflow over the water in the receptacle and evaporating the water via forced convection to generate a cooling effect. The airflow may enter and exit the receptacle through the one or more openings in the receptacle. For instance, the airflow may enter through the air inlet holes and flow over the water byproduct in the receptacle to evaporate the water. The cooling system is configured to direct the evaporated water to flow along and near the surface of the fuel cell, so as to remove heat from the fuel cell. The evaporated water is then driven out by the airflow to exit the receptacle via the air exhaust vent. The airflow may be driven with aid of one or more propulsion units of the UAV, or with aid of one or more internal fans or pumps. The one or more propulsion units may include a propeller of the vehicle. The evaporation of the byproduct aids in regulating a temperature of the fuel cell. For instance, the flow of the evaporated water along the heated surface(s) of the fuel cell may remove at least a portion of heat that is generated by the fuel cell during the electrochemical reaction. The cooling system can regulate the temperature of the fuel cell, thus prolonging service life and improving performance/reliability of the fuel cell.

In some instances, the evaporation of the water may further aid in regulating an internal temperature of the UAV. In some embodiments, the cooling system and the venting system may use the same components. In some other embodiments, the cooling system and the venting system may be the same system. Having the cooling system may increase the rate at which heat may be removed from the fuel cell. For instance, the rate of heat removal may be increased by at least 1%, 3%, 5%, 7%, 10%, 15%, 20%, 25%, 30%, 40%, 50%, 60%, 70%, 80%, 90%, 100%, or 200% of the rate of heat removal without venting. The forced convection may cause air to flow over near the surface of the fuel cell at a rapid rate. For instance, the forced convection may cause forced airflow over the surface of the fuel cell at a speed of at least 5 cm/s, 10 cm/s, 15 cm/s, 20 cm/s, 25 cm/s, 30 cm/s, 40 cm/s, 50 cm/s, 60 cm/s, 70 cm/s, 80 cm/s, or 100 cm/s. The forced airflow may be within a housing of the UAV. The direction of the forced airflow may be substantially parallel to the surface of the fuel cell. Alternatively, the direction of the forced airflow may be substantially perpendicular to the surface, or at any other angle relative to the surface (e.g., about 15 degrees, 30 degrees, 45 degrees, 60 degrees, or 75 degrees) of the fuel cell.

Figure 10:
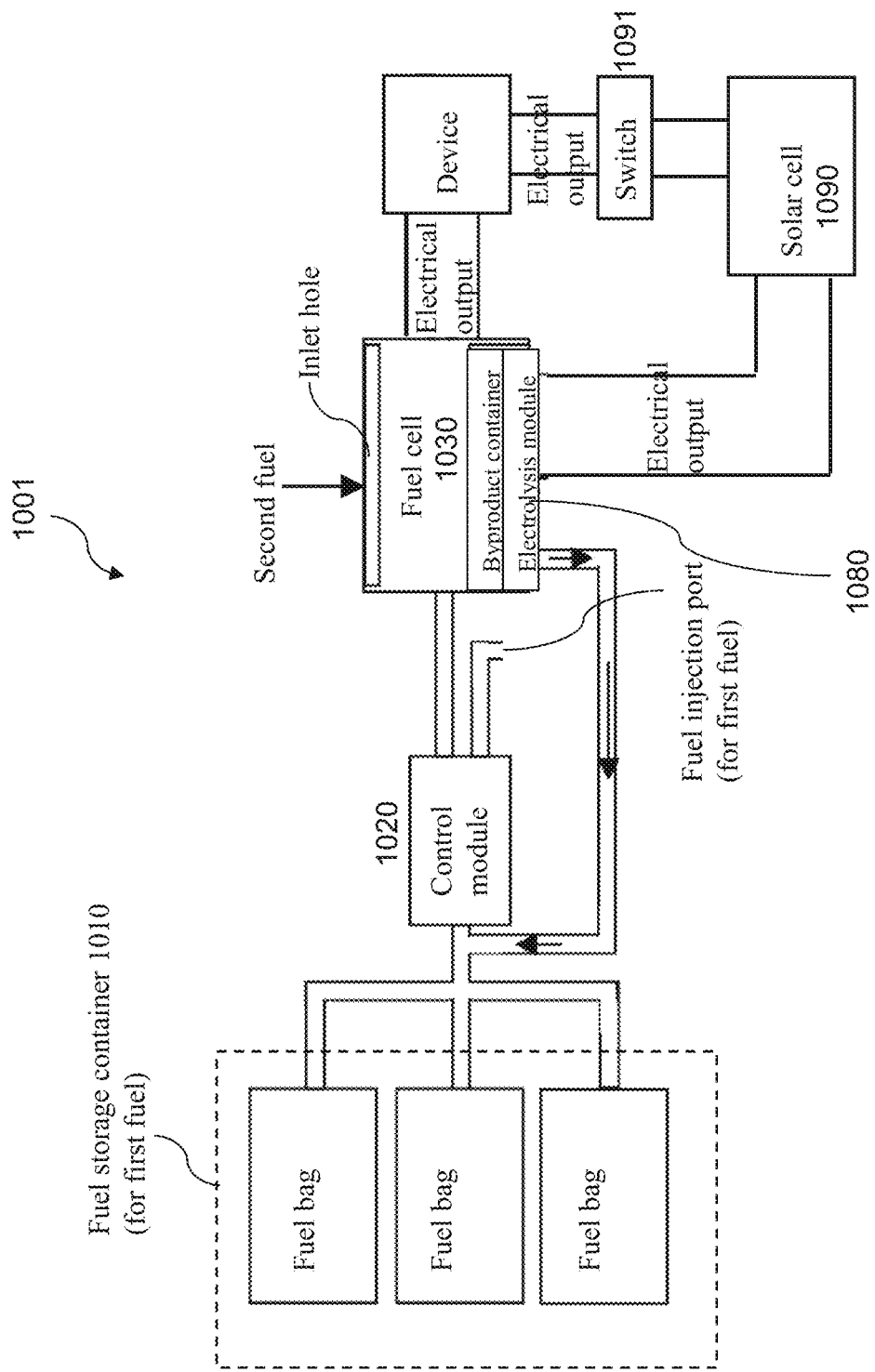
FIG. 10 illustrates a fuel cell system in accordance with another further embodiment.

FIG. 10 illustrates a fuel cell system in accordance with another further embodiment. The fuel cell system of FIG. 10 may be provided as an energy delivery system. Referring to FIG. 10, the fuel cell system 1001 comprises the fuel storage container 1010, the control module 1020, and the fuel cell 1030. The fuel cell system may be provided on a UAV, and may be used to power the UAV. The fuel cell system 1001 of FIG. 10 is similar to the fuel cell system 201 of FIG. 2 except for the following differences. In the embodiment of FIG. 10, the fuel cell system 1001 further comprises an electrolysis module 1080, a solar energy generation system 1090, and a switch 1091. The electrolysis module may be configured to electrolyze the byproduct of the fuel cell electrochemical reaction to: (1) remove the byproduct from the vehicle (through decomposition of the byproduct into its elements), and/or (2) generate additional first fuel for the fuel cell. The solar energy generation system may be configured to power the electrolysis module and/or a device. The device may comprise one or more propulsion units and/or the power consuming unit of the UAV. The controller in the control module may be configured to generate instructions for the solar energy generation system to provide the electrical energy to at least one of the group consisting of: (1) the electrolysis module to effect operation of the electrolysis module, and (2) the device. The electrical energy may be provided to at least one of the aforementioned groups using the switch. The operation of the electrolysis module and the solar cell, and the control of the switch, will be described below with reference to FIG. 11 which illustrates a schematic diagram of the fuel cell system of FIG. 10 in further detail.

Figure 11:
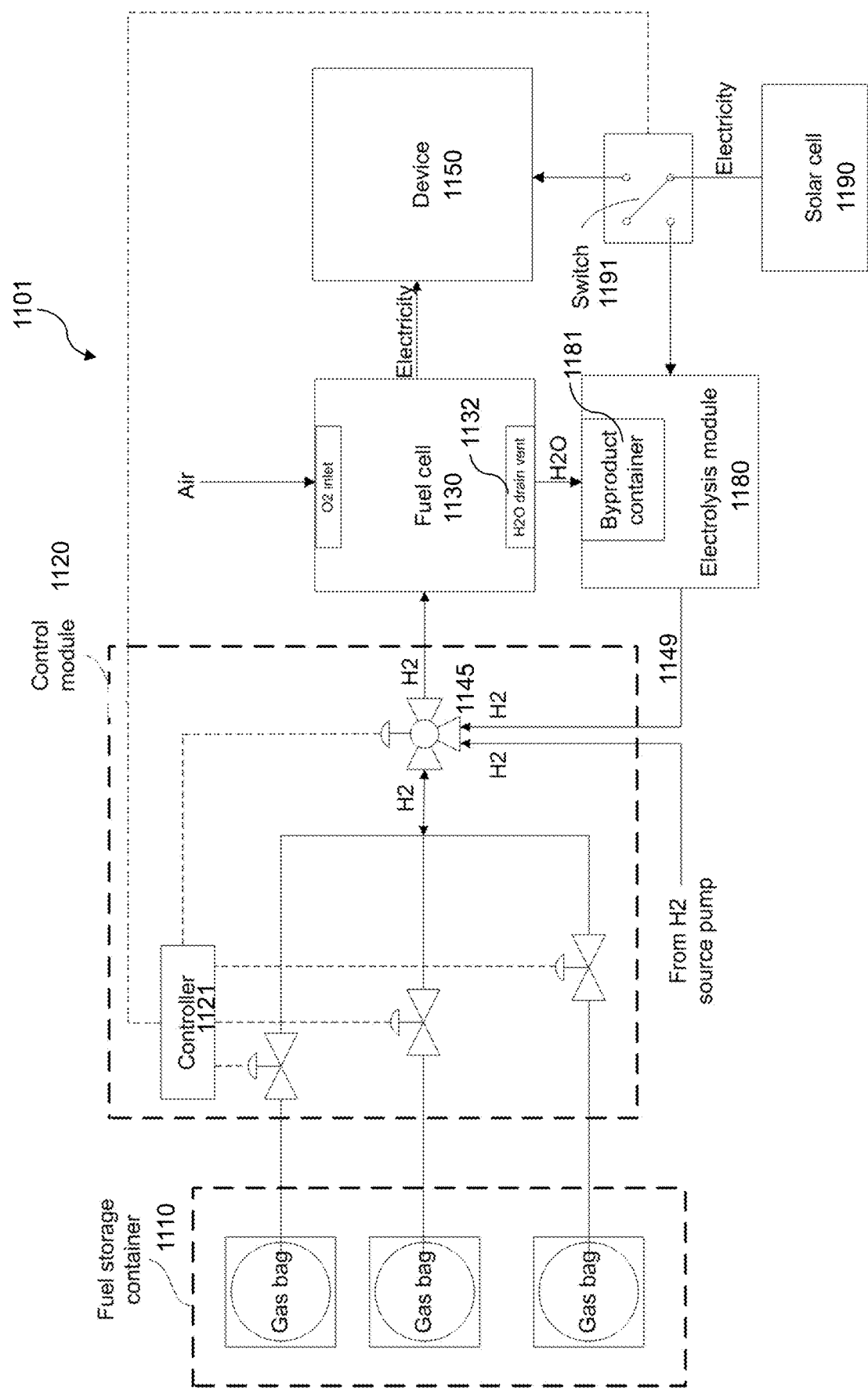
FIG. 11 illustrates a schematic diagram of the fuel cell system of FIG. 10 in further detail, in accordance with some embodiments.

Referring to FIG. 11, the fuel cell system 1101 comprises the fuel storage container 1110, the control module 1120, the fuel cell 1130, the electrolysis module 1180, the solar cell 1190, and the switch 1191. The fuel cell system may be provided on a UAV, and may be used to power the UAV. The fuel storage container may be connected to the fuel cell via the plurality of pipes.

In the embodiment of FIG. 11, the first fuel may be hydrogen gas (H2) and the second fuel may be oxygen gas (O2). The electrochemical reaction between hydrogen and oxygen gas in the fuel cell generates water as the byproduct. The water may be collected in a byproduct container 1181. The electrolysis module may be configured to generate hydrogen from the water collected in the byproduct container. In some embodiments, the water used by the electrolysis module may be entirely provided from a byproduct of the fuel cell. In other instances a water storage tank may be provided that may comprise a limited store of water. In some instances, moisture may be harvested from the ambient air and used as water for the electrolysis module.

The solar energy generation system may be configured to convert solar energy to electrical energy. The solar energy generation system may include one or more solar cells. The one or more solar cells may be photovoltaic (PV) cells. The solar cell may convert light energy directly into electronic energy using photovoltaic effects. Any description herein of the energy generation system may apply to one or more solar cells, and vice versa. The electrical energy from a solar cell may be used to power the electrolysis module to generate hydrogen through electrolysis of water. During the electrolysis process, a direct electric current (DC) from the solar cell is passed through the water causing it to decompose into hydrogen gas (H2) and oxygen gas (O2). The electrical energy from the solar cell may also be used to power the device 1150. The device may be a component of the UAV, such as one or more propulsion units and/or the power consuming unit.

The water byproduct from the fuel cell is discharged through the H2O drain vent 1132 of the fuel cell into the byproduct container. The byproduct container may be a part of the electrolysis module. In some embodiments, the byproduct container and the electrolysis module may be different components. The byproduct container is electrically connected to the electrolysis module which is in turn electrically connected to one or more solar cells. The electrolysis module is powered by the one or more solar cells and configured to apply a direct electric current (DC) to electrolyze the water. The direct electric current may be applied through a positive (+) electrode and a negative (−) electrode that are immersed in the water in the byproduct container. In practice, hydrogen and oxygen can be produced if the DC voltage is greater than the water electrolysis voltage (decomposition potential) of 1.23 V.

A solar cell may be provided on a top surface of the body or housing of the UAV to receive the maximum amount of sunlight. For instance, one or more solar cells may be provided on a top surface of a central body of the UAV and/or one or more arms of the UAV. The solar cells may optionally also be provided on a side surface of the UAV (e.g., at the central body and/or arms) or a bottom surface of the UAV. The solar cells may be formed on a surface of a housing of the UAV. In some embodiments, the solar cell may be a lightweight thin film solar cell having certain flexibility. The use of flexible solar cells may allow the solar cells to conform to a shape of a surface of the UAV. The solar cells may be applied to a surface of the UAV without significantly altering the aerodynamics of the UAV.

In some alternate embodiments, the UAV may have a separate structure configured to support the solar cells. For instance, a platform or other surface may be provided or carried by the UAV. This may provide increased surface area for the UAV to collect solar energy. The additional structure may be of a lightweight material. In some instances, the lightweight material may be flexible, or rigid.

The outputs of a solar cell may be respectively connected to an anode and a cathode of the byproduct container. The electrical energy of the solar cell provides the energy required for water electrolysis. The hydrogen produced from the electrolysis module is provided via a pipe 1149 to the main gas flow control valve 1145.

The controller 1121 may be configured to control the main gas flow control valve and other control valves, to either direct the electrolyzed hydrogen to be stored in one or more of the gas bags, or to the fuel cell for electricity generation. The pressure and flow rate of the electrolyzed hydrogen may be regulated by the controller using one or more of the control valves.

In some embodiments, a switch 1191 may be provided between the solar cell and the electrolysis module, and between the solar cell and the device. The switch is configured to receive instructions from the controller, and switch between different positions in response to the instructions. For instance, the switch may electrically connect the solar cell with the electrolysis module when the switch is in a first position. When the switch is in the first position, the solar cell may be electrically isolated from the device. The switch may electrically connect the solar cell to the device when the switch is in a second position. When the switch is in the second position, the solar cell may be electrically isolated from the electrolysis module. When the switch is in a third position, the solar cell may be electrically isolated from both the electrolysis module and the device. When the switch is in a fourth position, the solar cell may be electrically connected to both the electrolysis module and the device. In some instances, the switch may move between electrically connecting the solar cell to the device and the solar cell to the electrolysis module. An option for not electrically connecting the solar cell to either component, or electrically connecting the solar cell to both components may or may not be available. Any description herein of a mechanical switch may apply to any other type of mechanism that may provide electrical connection and disconnection. In some instances, electronic switches (e.g., MOSFETs) may be implemented.

The device may be a vehicle such as an unmanned aerial vehicle (UAV). The device may be a component on-board the vehicle. For instance, the device may comprise one or more propulsion units of the vehicle. The device may also include a power consumption unit of the vehicle. The device may be an energy storage unit of the vehicle (e.g., battery). The energy storage unit may in turn power one or more other components of the vehicle.

In some instances, if the energy generated by the solar cell is greater than the power consumed by the electrolysis module, the excess energy may be supplied to power the device. Accordingly, the flight time of the vehicle can be extended.

In some embodiments, the fuel cell system may further comprise an energy storage unit configured to store electrical energy from the solar cell and/or the fuel cell. The energy storage unit may be configured to provide energy to the electrolysis module and/or the device. The energy storage unit may comprise one or more battery cells. The battery cells may be rechargeable. The one or more battery cells may comprise one or more lithium-ion battery cells. In some instances, if the energy generated by the solar cell is greater than the power consumed by the electrolysis module, the excess energy may be stored in the energy storage unit.

In some embodiments, the controller may be configured to maintain/adjust the pressure of the gas bag in the fuel storage container, by controlling the electrolysis module to generate hydrogen gas that is then provided back to the gas bag. For instance, when the pressure of hydrogen gas inside the gas bag is reduced below a predetermined pressure threshold, a pressure sensor inside the air bag or along the distribution pipe may trigger a signal to the controller to operate the electrolysis module, which in turn electrolyzes water to generate and send a burst of hydrogen gas to replenish the gas bag until the gas bag reaches the predetermined pressure threshold. When the pressure of the gas bag reaches the predetermined pressure threshold, the pressure sensor sends a feedback signal to the controller to turn off the electrolysis module (i.e., stop the electrolysis process) and close the control valve to the gas bag.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a remotely controlled vehicle described elsewhere herein. In some embodiments, the movable object can be mounted on a living subject, such as a human or an animal.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 cm, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. Optionally, a ratio of a movable object weight to a load weight may be greater than, less than, or equal to about 1:1. When desired, the ratio of a movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
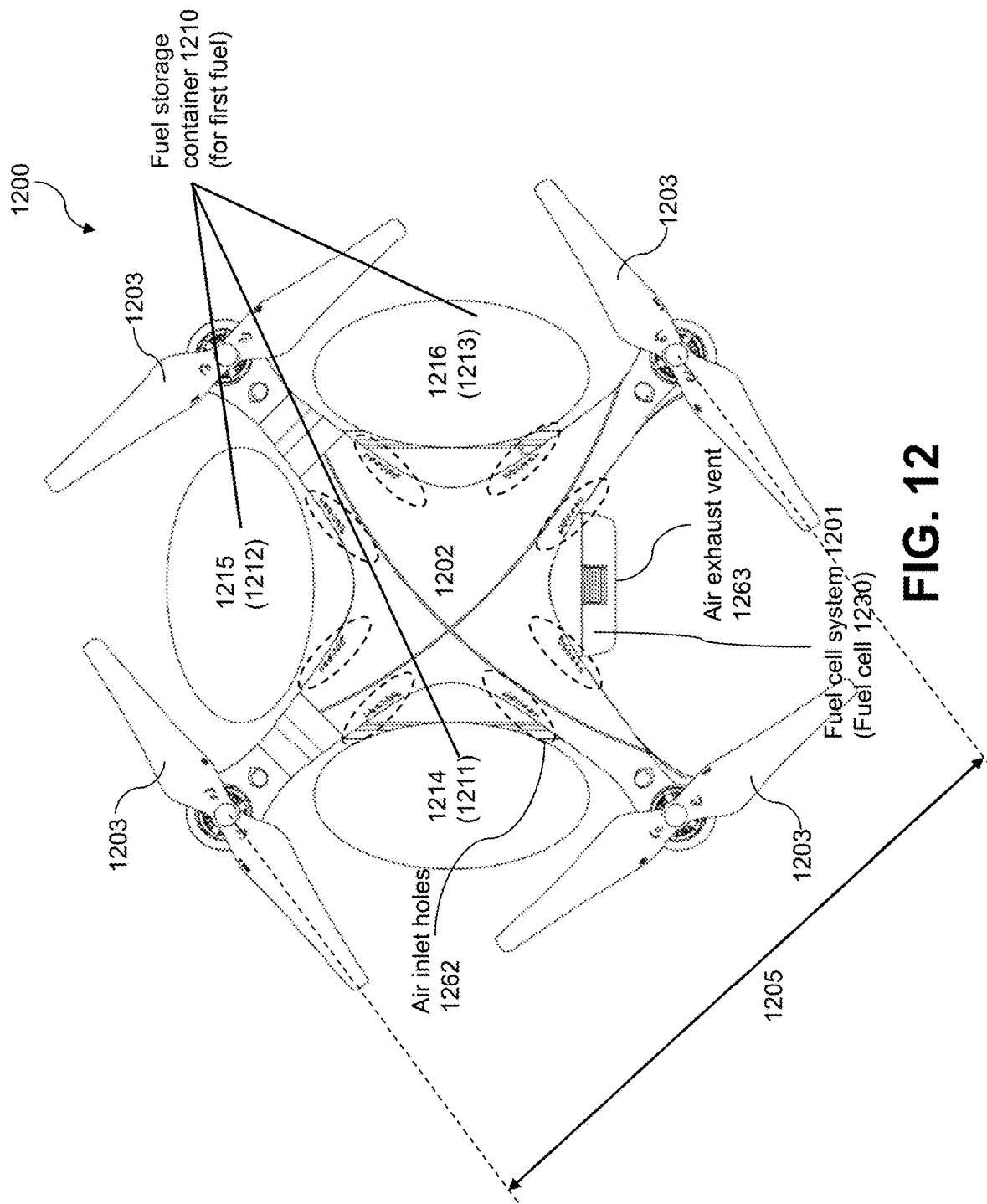
FIG. 12 shows a detailed top view of a UAV comprising a fuel cell system and a venting system, in accordance with some embodiments.

FIG. 12 illustrates an unmanned aerial vehicle (UAV) 1200, in accordance with embodiments of the present invention. The view in FIG. 12 may, for example, correspond to a top view of the UAV 700 of FIG. 7. The UAV 1200 may be an example of a movable object as described herein. The UAV 1200 can include a propulsion system having four rotors 1203. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 1205. For example, the length 1205 can be less than or equal to 2 m, or less than equal to 5 m. In some embodiments, the length 1205 can be within a range from 40 cm to 7 m, from 70 cm to 2 m, or from 5 cm to 5 m. Any description herein of a UAV may apply to a movable object, such as a movable object of a different type, and vice versa.

The UAV 1200 may comprise the fuel cell system having the venting system, in accordance with some embodiments. Referring to FIG. 12, the UAV comprises the fuel cell system 1201. The fuel cell system comprises the fuel cell 1230 operably connected to the fuel storage container 1210. The fuel cell may be disposed in or adjacent to a housing 1202 of the UAV. The housing may include a central cavity within a central body of the UAV. The housing may include one or more branch cavities within one or more corresponding arms of the UAV. The central cavity and the one or more branch cavities may be in fluidic communication with one another.

The fuel storage container may be configured to store the first fuel. The fuel storage container may comprise one or more fuel storage cases, such as three fuel storage cases 1214, 1215, and 1216 configured to respectively contain gas bags 1211, 1212, and 1213 therein. The fuel storage cases may be attached onto the body or housing of the UAV. The density of hydrogen gas in the fuel storage container may be substantially lower than the density of air surrounding the UAV. Accordingly, when the gas bags are filled with hydrogen gas, a lift force to the UAV may be generated, which may lower the load and increase flight time of the UAV. In some alternate embodiments, gas bags may be directly provided without requiring additional fuel storage cases. The external surface of the gas bags may be directly exposed to the ambient environment.

The gas bags may be located anywhere on the UAV. In some instances, the gas bags may be located outside the housing of the UAV. The gas bags may be located at or near a central body of the UAV. The gas bags may be located along a side surface of the central body, bottom surface of the central body, and/or top surface of the central body. The gas bags may be located on or near one or more arms of the UAV. In some embodiments, the gas bags may be located on side surface of the central body between arms of the UAV. The gas bags and/or fuel storage cases may be designed to not significantly impede the aerodynamics of the UAV. The gas bags and/or fuel storage cases may be designed to not interfere with the rotors of the UAV.

The fuel cell is configured to generate electricity and a byproduct, by reacting the first fuel with a second fuel through an electrochemical reaction. The UAV further comprises the venting system for removing the electrochemical reaction byproduct of the fuel cell. The venting system may be configured to evaporate and remove the byproduct from the UAV using convection. The byproduct may be exposed to forced convection in the venting system. The forced convection may be generated with aid of one or more propulsion units 1203 of the UAV that generates airflow over the byproduct. The forced convection may be generated using any other technique described elsewhere herein. The forced convection may force an airflow over the byproduct with aid of one or more power consuming units. In some embodiments, the speed of the airflow may be greater with forced convection than via a natural flow.

The venting system may comprise one or more air inlet holes 1262 and one or more air exhaust vents 1263. The air inlet hole and the exhaust vent may be provided on the housing of the UAV. The airflow may be directed into the venting system through the air inlet hole. The one or more propulsion units may include a propeller of the UAV. The propulsion units of the UAV may force air from the ambient environment into an arm of the UAV through the air inlet hole. In some embodiments, the air inlet hole may be located on an arm of the UAV. The air inlet hole may be at or near an end of the arm of the UAV (e.g., within 1%, 5%, 10%, 20%, 30%, 40%, or 50% of the distal end of the arm). The air inlet hole may be positioned near the propeller of the UAV (e.g., within 1%, 3%, 5%, or 10% of the length of the arm of the propeller). Alternatively, the air inlet hole need not be near the propeller of the UAV. The propulsion units may force the air to flow along the arm of the UAV to a central cavity of the UAV where the fuel cell and its byproduct are stored. The byproduct may be evaporated by the airflow and discharged through the air exhaust vent. The air exhaust vent may be located on a central body of the UAV. The air exhaust vent may be located near an area where the byproduct may collect (e.g., within 1 cm, 3 cm, 5 cm, or 10 cm). The byproduct may be removed from the UAV to reduce a weight of the UAV. The weight of the UAV may be reduced to decrease an amount of power needed to power the UA, so as to increase a flight time and range of the UAV.

The UAV may have one or more air inlet holes. In some embodiments, each arm may have one or more air inlet holes. The air inlet holes may be openings in an arm housing that may provide fluid communication from an external environment to an interior cavity of the arm. The air inlet holes may be on a side surface, bottom surface, and/or top surface of an arm.

The UAV may have one or more air exhaust vents. In some instances, the central body may have one or more openings that function as the air exhaust vent. The openings may be provided in a central body housing and may provide fluid communication from an interior of a central cavity to the ambient environment. The air exhaust vent may be on a lower surface, side surface, and/or top surface of the central body housing. In some embodiments, more air inlet holes may be provided than air exhaust vents.

When the first fuel is hydrogen gas (H2) and the second fuel is oxygen gas (O2), the electrochemical reaction between hydrogen and oxygen gas in the fuel cell generates water as the byproduct. The water may be evaporated and removed from the UAV by forcing airflow over the water. The airflow may be introduced through an arm of the UAV. The airflow may enter and exit through one or more air inlet holes located on the arm of the UAV. The airflow may enter through the air inlet hole and flow over the water byproduct of the fuel cell to evaporate the water. The evaporated water is then driven out by the airflow to exit the UAV via the air exhaust vent. The air exhaust vent may be located near the portion of the housing where the fuel cell and its water byproduct are stored. The airflow may be driven with aid of one or more propulsion units of the UAV. The one or more propulsion units may include a propeller of the vehicle. In some embodiments, the airflow may be introduced through a central body of the vehicle, whereby the airflow enters through an opening in the central body of the vehicle. The water may be removed from the UAV to the ambient environment by the venting system through the air exhaust vent. The water may be removed from the UAV to reduce a weight of the UAV. The weight of the UAV may be reduced to decrease an amount of power required to power the UAV, so as to increase a flight time of the UAV.

In some instances, the evaporation of the water may further aid in regulating an internal temperature of the UAV. In some embodiments, the UAV 1200 of FIG. 12 may include the cooling system described elsewhere herein. The cooling system and the venting system may use the same components. In some other embodiments, the cooling system and the venting system may be the same system. Having the cooling system may increase the rate at which heat may be removed from the fuel cell.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

A user may be able to control one or more aspects of a fuel control system (or fuel cell system) of a UAV remotely. For instance, a user may be able to send a command that may affect operation of the fuel control system (or fuel cell system). A user may be able to select between a regular energy storage unit power mode and a fuel cell power mode. A user may be able to select whether an electrolysis module is or is not used. A user may be able to select an energy generation mode from a plurality of available energy generation modes. The user may be able to view measurements relating to energy production and/or fuel usage.

In some embodiments, a user may be able to determine the amount (e.g., weight) of the byproduct generated by the fuel cell using one or more weight sensors located where the byproduct is collected. Based on the determined amount of the byproduct, a user may be able to select a first portion of the byproduct for generating fuel for the fuel cell using the electrolysis module. In addition, a user may be able to select a second portion of the byproduct to be discharged from the vehicle using the venting system. In some instances, a user may be able to select a third portion of the byproduct for cooling the fuel cell using the cooling system. In some examples, a ratio of the first portion to the second portion to the third portion may be less than, equal to, or greater than about 1:1:1. Any ratio of the first portion to the second portion to the third portion of the byproduct is contemplated. For example, the ratio of the first portion to the second portion to the third portion may be x:y:z, where x is any integer ranging from 1 to 9, y is any integer ranging from 1 to 9, and z is any integer ranging from 1 to 9. It is noted that the conditions for which x=y=z correspond to a base ratio of 1:1:1. A user may be able to select any ratio based on the present needs of the vehicle as determined by one or more sensors. For example, in some instances, if the power supply of the vehicle is low, a user may be able to select a higher proportion of the byproduct to be used for generating fuel for the fuel cell using the electrolysis module. In other instances, a user may be able to select a higher proportion of the byproduct to be discharged so as to reduce the load and increase flight time of the vehicle. In some further instances, a user may be able to select a higher proportion of the byproduct to be used for cooling if the fuel cell or other components of the vehicle is overheating. In some embodiments, a user may be able to use all of the byproduct for generating fuel for the fuel cell using the electrolysis module. In other embodiments, a user may be able to discharge all of the byproduct into the ambient environment using the venting system. In some further embodiments, a user may be able to use all of the byproduct for cooling the fuel cell using the cooling system. Accordingly, a user can use or discharge the byproduct in an efficient manner to meet the vehicle's various needs (e.g., power, cooling, reduced load, etc.), by using one or more and/or different combinations of the embodiments described herein.

In other embodiments, energy generation may occur without requiring any user input. Various energy generation modes or parameters may be automatically selected by one or more processors. For instance, a controller may determine a most effective energy production mode for a UAV at a given moment and use that energy production mode.

Figure 13:
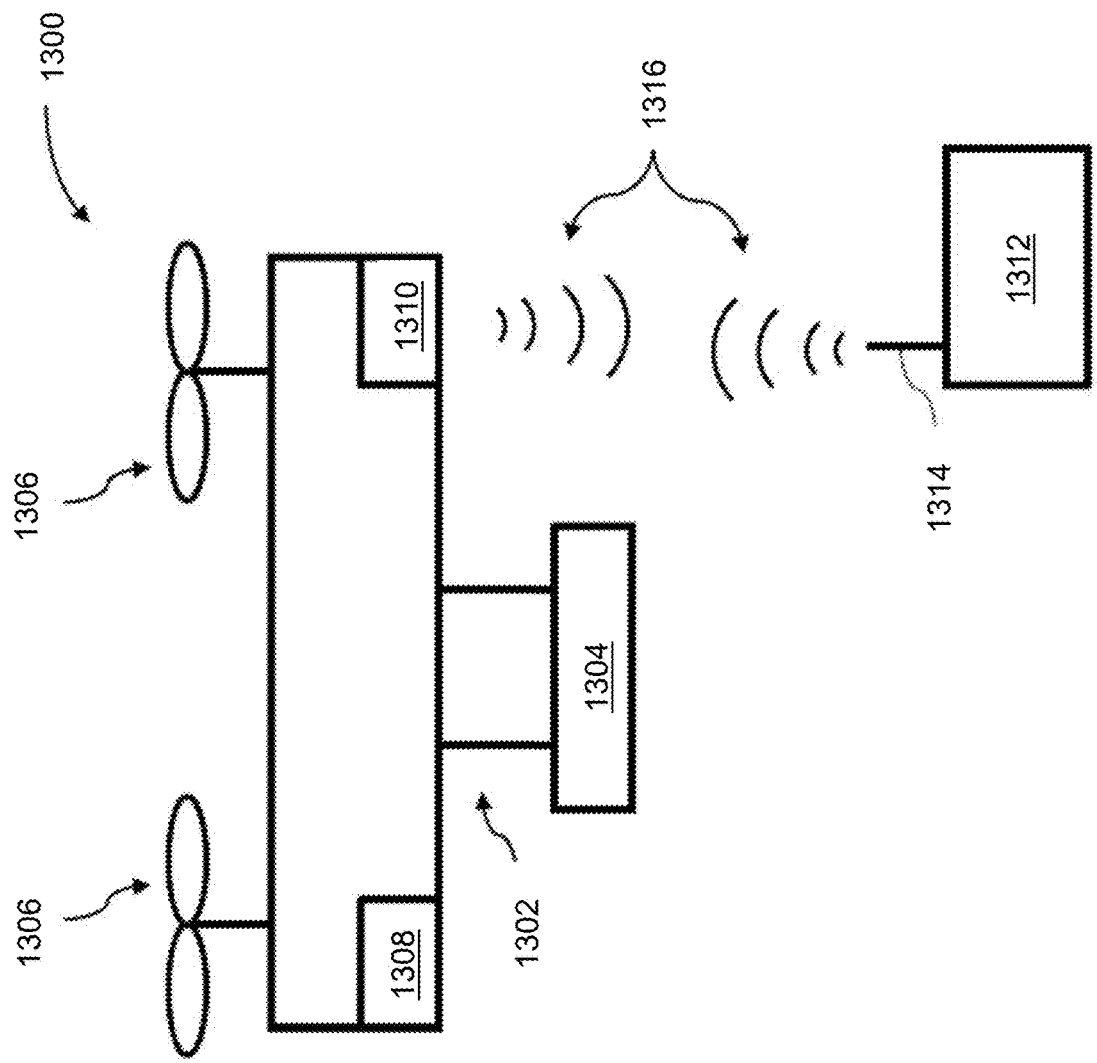
FIG. 13 illustrates a movable object, in accordance with some embodiments.

FIG. 13 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some instances, the payload 1304 may be provided on the movable object 1300 without requiring the carrier 1302. The movable object 1300 may include propulsion mechanisms 1306, a sensing system 1308, and a communication system 1310. The propulsion mechanisms 1306 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 900 to hover in the air at a specified position and/or orientation.

For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 910 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 914, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV) comprising:
   a fuel cell in communication with a fuel storage container, wherein the fuel cell is configured to generate electricity and a byproduct, by reacting a first fuel from the fuel storage container with a second fuel through an electrochemical reaction; and
   a venting system configured to expose the byproduct to forced convection;
   wherein:

the fuel storage container includes a storage case formed from a rigid material and a conformable bag placed inside the storage case, the conformable bag having a chamber configured to store the first fuel, the storage case being partially filled with an inert gas; and when an outer surface of the conformable bag touches an inner wall the of storage case, the first fuel stored in the camber of the conformable bag reaches a predetermined pressure, the predetermined pressure being below a neutral buoyancy pressure to cause the fuel storage container to provide a lift force to the UAV.

2. The UAV of claim 1, wherein the byproduct is evaporated and removed from the UAV via the forced convection through the venting system.

3. The UAV of claim 1, wherein the forced convection is generated with aid of one or more propulsion units of the UAV that generates airflow over the byproduct, and wherein said propulsion units include at least one propeller.

4. The UAV of claim 3, wherein the one or more propulsion units of the vehicle are configured to force air from an ambient environment to (1) flow into at least one arm of the UAV and (2) flow along said arm to a central cavity of the UAV.

5. The UAV of claim 4, wherein the fuel cell is stored within the central cavity of the UAV.

6. The UAV of claim 1, wherein the first fuel comprises hydrogen and the second fuel comprises oxygen.

7. The UAV of claim 1, wherein the conformable bag is made of a light-weight polymer comprising polyester, polyester fiber, mylar, or reinforced nylon.

8. The UAV of claim 7, wherein the conformable bag is made of a flame-resistant material.

9. The UAV of claim 1, wherein the fuel storage container is connected to the fuel cell via an air duct.

10. The UAV of claim 9, further comprising a control module configured to control flow of the first fuel from the fuel storage container to the fuel cell.

11. The UAV of claim 10, wherein the control module is configured to control an on/off state, flow rate, and/or flow pressure of the first fuel along the air duct.

12. The UAV of claim 1, further comprising an electrolysis module configured to generate the first fuel from a liquid byproduct of the electrochemical reaction.

13. The UAV of claim 12, further comprising at least one solar cell configured to convert solar energy to electrical energy.

14. The UAV of claim 13, wherein the electrical energy from the solar cell is used to (1) power the electrolysis module to generate the first fuel from the liquid byproduct, and/or (2) power one or more components of the UAV.

15. The UAV according to claim 1, wherein the fuel storage container further includes one of a contact sensor or a proximity sensor placed on an inner wall of the storage case, the contact sensor or the proximity sensor configured to sense the outer surface of the conformable bag touching the inner wall the of storage case.

16. The UAV according to claim 1, wherein the fuel bag includes an inner layer and the shell layer, wherein the inner layer is formed of a high-molecular-weight polymer and the shell layer is formed of an elastic carbon fiber-epoxy resin composite.

* * * * *